(12) United States Patent
Hammond et al.

(10) Patent No.: US 10,416,668 B2
(45) Date of Patent: Sep. 17, 2019

(54) SCANNING ENVIRONMENTS AND TRACKING UNMANNED AERIAL VEHICLES

(71) Applicant: PreNav, Inc., San Carlos, CA (US)

(72) Inventors: Asa Hammond, Cotati, CA (US); Nathan Schuett, Belmont, CA (US); Naimisaranya Das Busek, Seattle, WA (US)

(73) Assignee: PRENAV, INC., Redwood City, CA (US)

( * ) Notice: Subject to any disclaimer, the term of this patent is extended or adjusted under 35 U.S.C. 154(b) by 151 days.

(21) Appl. No.: 15/059,101

(22) Filed: Mar. 2, 2016

(65) Prior Publication Data

US 2016/0292869 A1 Oct. 6, 2016

Related U.S. Application Data

(60) Provisional application No. 62/127,476, filed on Mar. 3, 2015.

(51) Int. Cl.
*G05D 1/00* (2006.01)
*H04N 13/128* (2018.01)
(Continued)

(52) U.S. Cl.
CPC ......... *G05D 1/0044* (2013.01); *B64C 39/024* (2013.01); *G01S 7/4813* (2013.01);
(Continued)

(58) Field of Classification Search
CPC .................................................. G08G 5/003
See application file for complete search history.

(56) References Cited

U.S. PATENT DOCUMENTS

| 5,243,370 A | 9/1993 | Slater |
| 6,471,160 B2 | 10/2002 | Grieser |

(Continued)

FOREIGN PATENT DOCUMENTS

| EP | 2511781 | 10/2012 |
| EP | 2772725 | 9/2014 |

(Continued)

OTHER PUBLICATIONS

Birnbaum et al., "Unmanned Aerial Vehicle Security Using Recursive Parameter Estimation", 2014 International Conference on Unmanned Aircraft Systems (ICUAS), May 27-30, 2014, pp. 692-702 (Year: 2014).*

(Continued)

*Primary Examiner* — Nay A Maung
*Assistant Examiner* — Jose Torres
(74) *Attorney, Agent, or Firm* — Perkins Coie LLP

(57) ABSTRACT

Systems and methods for scanning environments and tracking unmanned aerial vehicles within the scanned environments are disclosed. A method in accordance with a particular embodiment includes using a rangefinder off-board an unmanned air vehicle (UAV) to identify points in a region. The method can further include forming a computer-based map of the region with the points and using the rangefinder and a camera to locate the UAV as it moves in the region. The location of the UAV can be compared with locations on the computer-based map and, based upon the comparison, the method can include transmitting guidance information to the UAV. In a further particular embodiment, two-dimensional imaging data is used in addition to the rangefinder data to provide color information to points in the region.

23 Claims, 19 Drawing Sheets

(51) Int. Cl.

| | | |
|---|---|---|
| G05D 1/10 | (2006.01) | |
| G08G 5/00 | (2006.01) | |
| G08G 5/04 | (2006.01) | |
| B64C 39/02 | (2006.01) | |
| G06F 3/0484 | (2013.01) | |
| G06K 9/00 | (2006.01) | |
| G06T 7/00 | (2017.01) | |
| G06T 17/05 | (2011.01) | |
| G06K 9/52 | (2006.01) | |
| G06K 9/62 | (2006.01) | |
| G06T 7/20 | (2017.01) | |
| G06T 7/60 | (2017.01) | |
| G01S 17/66 | (2006.01) | |
| G01S 17/87 | (2006.01) | |
| G01S 17/89 | (2006.01) | |
| G01S 17/93 | (2006.01) | |
| G01S 17/02 | (2006.01) | |
| G01S 7/481 | (2006.01) | |
| H04N 13/00 | (2018.01) | |
| F03D 17/00 | (2016.01) | |

(52) U.S. Cl.
CPC ............ *G01S 17/023* (2013.01); *G01S 17/66* (2013.01); *G01S 17/87* (2013.01); *G01S 17/89* (2013.01); *G01S 17/933* (2013.01); *G05D 1/0033* (2013.01); *G05D 1/0094* (2013.01); *G05D 1/102* (2013.01); *G06F 3/0484* (2013.01); *G06K 9/00214* (2013.01); *G06K 9/52* (2013.01); *G06K 9/6267* (2013.01); *G06T 7/0004* (2013.01); *G06T 7/20* (2013.01); *G06T 7/60* (2013.01); *G06T 17/05* (2013.01); *G08G 5/0069* (2013.01); *G08G 5/045* (2013.01); *H04N 13/128* (2018.05); *B64C 2201/146* (2013.01); *F03D 17/00* (2016.05); *G06T 2207/10028* (2013.01); *G06T 2207/10032* (2013.01); *G06T 2207/20221* (2013.01); *G06T 2207/30181* (2013.01); *G06T 2207/30241* (2013.01); *G06T 2207/30252* (2013.01); *H04N 2013/0081* (2013.01)

(56) References Cited

U.S. PATENT DOCUMENTS

| | | | |
|---|---|---|---|
| 6,804,607 B1* | 10/2004 | Wood | G01S 3/784 |
| | | | 180/167 |
| 8,301,326 B2 | 10/2012 | Malecki et al. | |
| 8,798,922 B2 | 8/2014 | Tillotson et al. | |
| 9,174,733 B1 | 11/2015 | Burgess et al. | |
| 9,262,929 B1 | 2/2016 | Roy et al. | |
| 9,274,521 B1* | 3/2016 | Stefani | G08G 5/0026 |
| 9,354,606 B1 | 5/2016 | Georges, III | |
| 9,773,420 B2 | 9/2017 | Ohtomo et al. | |
| 2003/0231793 A1 | 12/2003 | Crampton | |
| 2004/0109012 A1 | 6/2004 | Kraus et al. | |
| 2005/0057741 A1 | 3/2005 | Anderson | |
| 2008/0075325 A1 | 3/2008 | Otani et al. | |
| 2009/0076665 A1 | 3/2009 | Hoisington et al. | |
| 2009/0323121 A1 | 12/2009 | Valkenburg et al. | |
| 2010/0208235 A1 | 8/2010 | Kaehler | |
| 2010/0283681 A1 | 11/2010 | Remondi et al. | |
| 2010/0286859 A1* | 11/2010 | Feigh | G05D 1/0044 |
| | | | 701/25 |
| 2010/0292871 A1 | 11/2010 | Schultz et al. | |
| 2012/0057174 A1 | 3/2012 | Briggs | |
| 2012/0136630 A1 | 5/2012 | Murohy et al. | |
| 2012/0262708 A1 | 10/2012 | Connolly | |
| 2013/0024411 A1 | 1/2013 | Cai et al. | |
| 2013/0135479 A1 | 5/2013 | Bregman-Amitai et al. | |
| 2013/0233964 A1 | 9/2013 | Woodworth et al. | |
| 2013/0301905 A1 | 11/2013 | Malecki et al. | |
| 2013/0314502 A1 | 11/2013 | Urbach et al. | |
| 2013/0317667 A1* | 11/2013 | Kruglick | B64C 39/024 |
| | | | 701/2 |
| 2014/0023381 A1 | 1/2014 | Hunt et al. | |
| 2014/0046589 A1 | 2/2014 | Metzler et al. | |
| 2014/0163775 A1* | 6/2014 | Metzler | G01C 15/002 |
| | | | 701/2 |
| 2014/0176677 A1 | 6/2014 | Valkenburg et al. | |
| 2014/0183300 A1 | 7/2014 | Macculloch et al. | |
| 2014/0210663 A1 | 7/2014 | Metzler et al. | |
| 2014/0257692 A1 | 9/2014 | Stefani et al. | |
| 2014/0316616 A1* | 10/2014 | Kugelmass | G05D 1/101 |
| | | | 701/8 |
| 2014/0371952 A1* | 12/2014 | Ohtomo | B64C 39/024 |
| | | | 701/2 |
| 2015/0153444 A1 | 6/2015 | Nichols et al. | |
| 2015/0370250 A1 | 12/2015 | Bachrach et al. | |
| 2016/0073096 A1 | 3/2016 | Hillebrand et al. | |
| 2016/0200437 A1 | 7/2016 | Ryan | |
| 2016/0223647 A1 | 8/2016 | Nichols et al. | |
| 2016/0247405 A1 | 8/2016 | Paczan et al. | |
| 2016/0247407 A1 | 8/2016 | Paczan et al. | |
| 2016/0265914 A1 | 9/2016 | Hunter | |
| 2016/0291593 A1 | 10/2016 | Hammond et al. | |
| 2016/0292872 A1 | 10/2016 | Hammon et al. | |
| 2016/0304198 A1 | 10/2016 | Jourdan | |
| 2016/0333691 A1 | 11/2016 | Puura et al. | |
| 2017/0031369 A1 | 2/2017 | Liu et al. | |
| 2017/0113816 A1 | 4/2017 | High et al. | |
| 2017/0201614 A1 | 7/2017 | Deng et al. | |
| 2017/0305546 A1* | 10/2017 | Ni | B64C 39/024 |
| 2018/0032088 A1 | 2/2018 | van Cruyningen | |

FOREIGN PATENT DOCUMENTS

| | | |
|---|---|---|
| EP | 3062066 | 8/2016 |
| EP | 3205977 | 8/2017 |
| FR | 2807603 | 10/2001 |
| KR | 10-1483057 | 1/2015 |
| WO | WO-2012049438 | 4/2012 |
| WO | WO-2016140985 | 9/2016 |

OTHER PUBLICATIONS

Vandapel et al., Natural Terrain Classification using 3-D Ladar Data, Proceedings of the 2004 IEEE, International Conference on Robotics and Automation, New Orleans, LA, Apr. 2004, 6 pages.

Becker et al., "LiDAR Inpainting from a Single Image," IEEE 12th International Conference on Computer Vision Workshops (ICCV Workshops), Oct. 4, 2009, 10 pages.

Mozas-Calvache et al., "Method for Photogrammetric Surveying of Archaeological Sites with Light AerialPlatforms," Journal of Archaeological Science, 2012, 10 pages.

\* cited by examiner

SCANNING ENVIRONMENTS AND TRACKING UNMANNED AERIAL VEHICLES

CROSS-REFERENCE TO RELATED APPLICATIONS

This application claims priority to U.S. Provisional Patent Application No. 62/127,476, filed on Mar. 3, 2015, titled SCANNING ENVIRONMENTS AND TRACKING UNMANNED AERIAL VEHICLES, which is herein incorporated by reference in its entirety.

TECHNICAL FIELD

The present disclosure is directed generally to scanning environments and tracking unmanned aerial vehicles.

BACKGROUND

Unmanned aerial vehicles (UAVs) have become increasingly popular devices for carrying out a wide variety of tasks that would otherwise be performed with manned aircraft or satellites. Such tasks include surveillance tasks, imaging tasks, and payload delivery tasks. However, UAVs have a number of drawbacks. For example, it can be difficult to operate UAVs, particularly autonomously, in close quarters, e.g., near buildings, trees, or other objects. In particular, it can be difficult to prevent the UAVs from colliding with such objects. While techniques exist for controlling UAVs and other autonomous vehicles in complex environments, such techniques typically rely on hardware that is too heavy, too bulky, and/or requires too much power to be carried by a typical UAV without dramatically impacting the range and/or payload capacity of the UAV. Accordingly, there remains a need for techniques and associated systems that can allow UAVs to safely and accurately navigate within their working environments.

DETAILED DESCRIPTION

Figure 1:
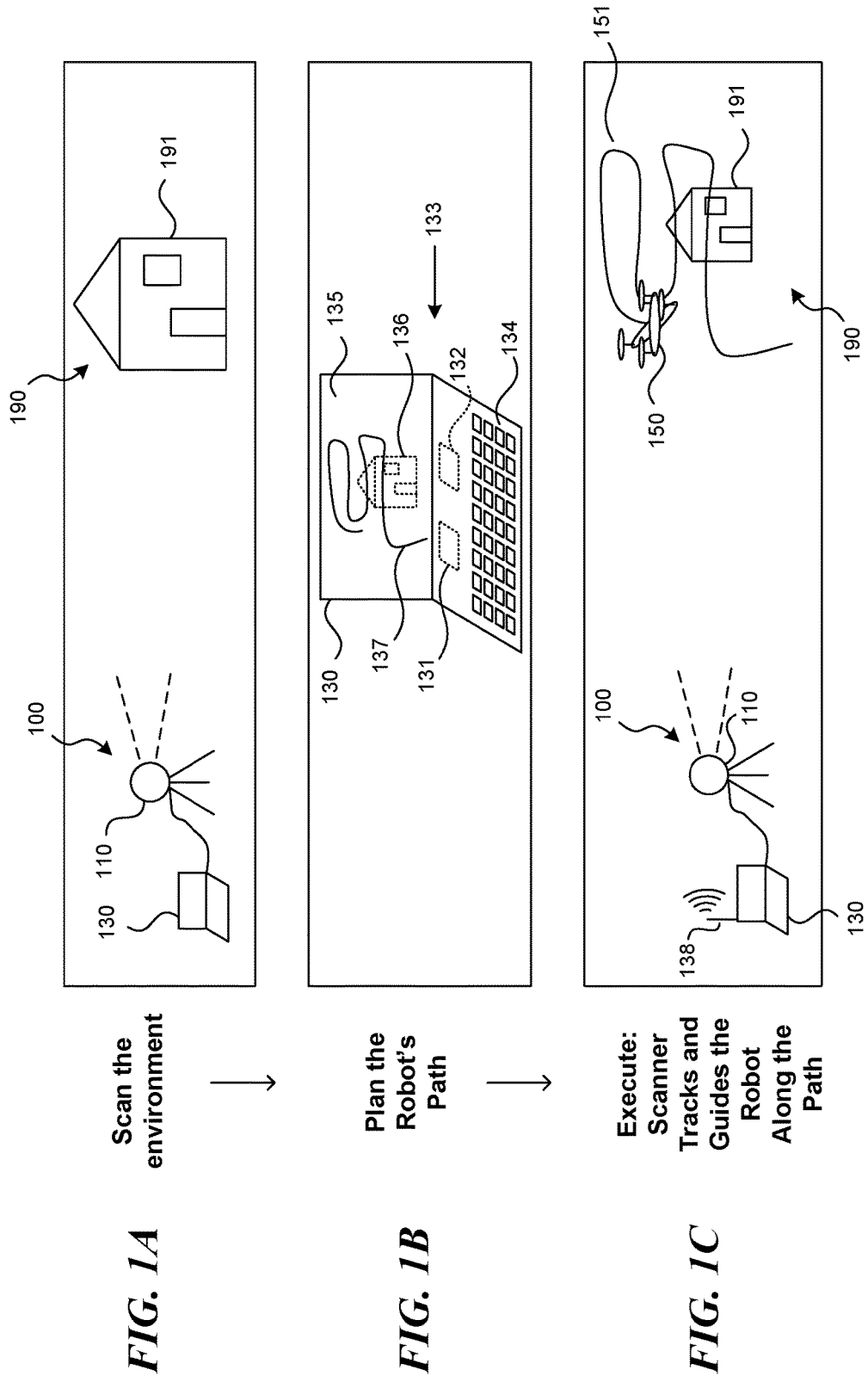
FIGS. 1A-1C are partially schematic, block diagrams illustrating an overall process for scanning an environment and tracking a UAV within the environment, in accordance with an embodiment of the present technology.

The present technology is directed generally to unmanned aerial vehicles (UAVs) and more particularly, to systems and methods for scanning the environments in which unmanned aerial vehicles operate, planning a flight for the unmanned aerial vehicles through one or more of the environments, and tracking the motion of the unmanned aerial vehicles in those environments. Specific details of several embodiments of the disclosed technology are described below with reference to particular, representative configurations. In other embodiments, the disclosed technology may be practiced in accordance with UAVs and associated systems having other configurations. In still further embodiments, particular aspects of the disclosed technology may be practiced in the context of autonomous vehicles other than UAVs (e.g., autonomous cars or watercraft). Specific details describing structures or processes that are well-known and often associated with UAVs, but that may unnecessarily obscure some significant aspects of the presently disclosed technology, are not set forth in the following description for purposes of clarity. Moreover, although the following disclosure sets forth several embodiments of different aspects of the disclosed technology, several other embodiments of the technology can have configurations and/or components different than those described in this section. As such, the present technology may have other embodiments with additional elements and/or without several of the elements described below with reference to FIGS. 1A-15C.

Several embodiments of the disclosed technology may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein include a suitable data processor and can include internet appliances and hand-held devices, including palmtop computers, wearable computers, cellular or mobile phones, multi-processor systems, processor-based or programmable consumer electronics, network computers, laptop computers, mini-computers and the like. Information handled by these computers can be presented at any suitable display medium, including a liquid crystal display (LCD). As is known in the art, these computers and controllers commonly have various processors, memories (e.g., non-transitory computer-readable media), input/output devices, etc.

The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer discs, as well as distributed electronically over networks. Data structures and transmissions of data particular to aspects of the technology are also encompassed within the scope of the present technology.

1. Overview

FIGS. 1A-1C schematically identify several functions that can be performed as part of the technology disclosed in the present application. FIG. 1A illustrates a process for scanning an environment 190 in which a UAV is expected to operate. The environment 190 can be indoors and/or outdoors, and include one or more objects 191, for example, a building. A system 100 in accordance with an embodiment of the present technology includes a scanner 110 that is used to scan the environment 190 and, in particular, the object or objects 191, to produce a computer-based model 136 of the environment 190. The scanner 110 can be controlled by a controller 130. The same controller 130 can be used to perform a variety of additional functions, also described herein, in accordance with particular embodiments of the present technology. In other embodiments, these functions may be divided over multiple controllers. Multiple controllers may be referred to herein as "controllers," and one or more controllers can be included in a "control system." As discussed above, the controller 130 can have any of a variety of suitable configurations, e.g., a laptop computer configuration.

As shown schematically in FIG. 1 B, the controller 130 can include a processor 131, a memory 132 (e.g., non-transitory computer-readable media), and one or more input/output devices 133. The input/output devices 133 can include an input device 134 (e.g., a keyboard) and an output device 135 (e.g., a screen displaying a graphical user interface). As shown in FIG. 1 B, the output device 135 is displaying a computer-based object image 136 of the environment 190, including the object 191 shown in FIG. 1A. The output device 135 also displays a proposed flight path image 137, representing a proposed flight path for a UAV in the region of the object 191. Accordingly, the controller 130 can be used to plan the UAV's flight path, e.g., by identifying obstacles in the flight path, alerting the operator to such obstacles, and/or suggesting or automatically implementing alternate flight paths.

A further aspect of the system is illustrated in FIG. 1C. The controller 130 and the scanner 110, initially described above with reference to FIG. 1A, can be used to track the motion of a UAV 150 as it operates in the environment 190 and around the object 191. In particular, the scanner 110 can be used in this context to identify the actual location of the UAV 150 relative to the computer-based model of the object 191, and can communicate this information to the UAV 150 via a communication device 138 (e.g., an antenna). Accordingly, the system 100 can be used to provide real-time data regarding the UAV's position and, by comparing that data to the model described above with reference to FIGS. 1A and 1B, can provide positional feedback to the UAV. The feedback can be used to adjust the UAV's actual flight path 151, as necessary, in comparison to the planned flight path 137 to allow the UAV to carry out its mission with a high degree of precision and/or avoid collisions.

Thus, the system 100 can be used to (a) map the environment in which the UAV operates, (b) facilitate defining a flight plan for the UAV in the environment, and (c) provide feedback to the UAV if it deviates from the flight plan. Further details of each of these functions are described below with reference to FIGS. 2-15C.

2. Scanning and Tracking

Figure 2:
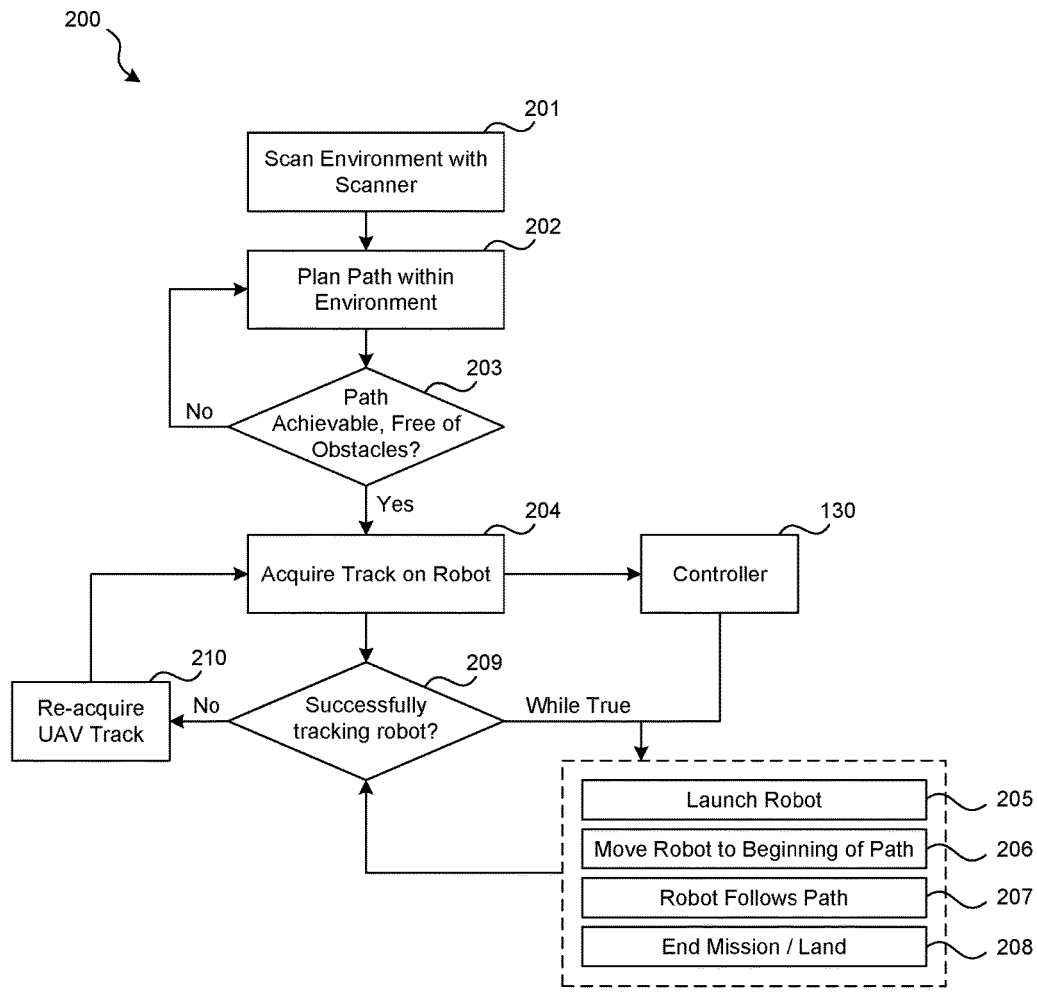
FIG. 2 is a flow diagram of a representative scanning and tracking process configured in accordance with a particular embodiment of the present technology.

FIG. 2 is a flow diagram illustrating a representative process for scanning an environment and tracking a UAV within the environment, in accordance with an embodiment of the present technology. The overall process can include the subprocesses of scanning, planning a flight path, and tracking the UAV. Depending on the embodiment, these subprocesses can be performed sequentially as part of a single overall process, or any of the subprocesses can be performed individually. The process 200 can include scanning the local environment with a ground or other off-board scanner (block 201). In a representative embodiment, the scanner is located on the ground, e.g., supported by a tripod or another suitable structure. In other embodiments, the scanner can have other locations, e.g., it can be carried aloft by a balloon or aircraft.

In block 202, the process includes planning a flight path within the environment, where the flight path may be manually input by a human operator or calculated automatically based on various constraints. In decision block 203, the process includes determining whether the planned path is achievable, for example, determining if the path is free of obstacles. If not, the process returns to block 202 for an update to the planned flight path. In various embodiments, the process can exclude detected obstacles when computing a revised path. If the path is achievable (e.g., is free of obstacles given the proximity constraints and dynamics of the UAV), the process proceeds to block 204, which begins the tracking portion of the process. As part of this process, the system acquires a track on the UAV as it is in use, e.g., as it takes off and flies. When the tracking information is acquired (e.g., when the location of the UAV is acquired with a camera and/or rangefinder), this location information can be transmitted to the controller 130 that controls the tracking device in pan and tilt axes, continuously keeping the UAV within the field of view. The controller 130 launches the UAV (block 205) and directs the UAV to the beginning of its planned flight path (block 206). In block 207, the UAV follows the flight path to its conclusion, and at block 208 lands at the end of the mission. During the course of the flight, the information received via tracking the UAV (e.g., the coordinates of the UAV) can be transmitted to the controller 130 to update the trajectory of the UAV. For example, if the UAV begins deviating from the pre-defined flight plan, the information can be used to guide (e.g., automatically) the UAV back to the planned route. Accordingly, portions of the controller can be located on-board the UAV, off-board the UAV, or both, depending on the manner in which UAV control and feedback are implemented.

As the UAV flies (blocks 205-208), the process includes checking, e.g., continually checking, to determine whether the UAV is successfully being tracked (block 209). As long as the UAV is being successfully tracked, the process continues as indicated. If the system loses track of the UAV, then in block 210, the process includes taking actions to facilitate re-acquiring the track on the UAV. Such steps can include directing the UAV to hover, land, and/or fly toward the scanner, and/or performing a sweeping (and/or other) motion with the scanner to locate the UAV, and/or other suitable actions.

As part of the process of flying the UAV, the operator can manipulate the progress of the UAV along the flight path. For example, the operator can use controls similar to VCR controls to fast-forward, reverse, or pause the progress of the UAV along the flight path. Such controls, of course, will be dependent on the UAV configuration, e.g., the UAV must have a hover capability in order for it to be paused. A similar approach can be used to preview the flight of the UAV along a proposed flight path, as part of the planning process for the flight path, which is described further below with reference to FIGS. 11-15C.

Figure 3:
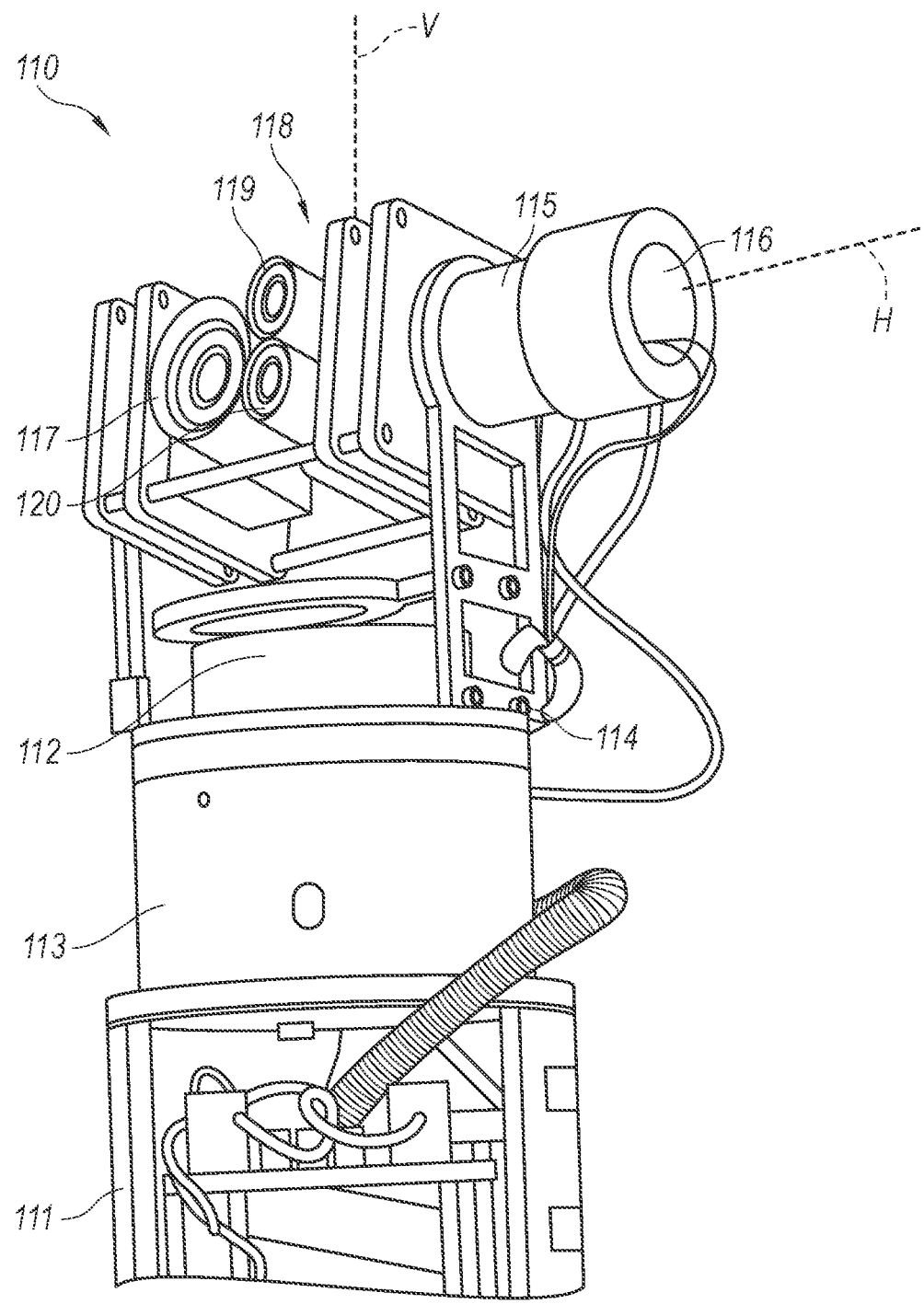
FIG. 3 illustrates a representative scanner configured in accordance with an embodiment of the present technology.

FIG. 3 is an isometric illustration of a representative scanner 110 having features configured in accordance with an embodiment of the present technology. The scanner 110 can include a support 111 that carries a camera 117 and a rangefinder 118. The camera 117 can be configured to produce two-dimensional optical images of the environment around the scanner 110 by receiving radiation from the environment in the visible spectrum, infrared range, and/or other suitable frequency ranges. The rangefinder 118 can include an emitter 119 and a receiver 120. The emitter 119 emits a signal that reflects from an object in the environment and is received by the receiver 120. The distance from the scanner 110 to the object is then determined or estimated by using any of a variety of suitable techniques, including estimating the amount of time required for the signal to transit from the emitter 119 to the object and back to the receiver 120 ("time of flight"). Accordingly, the camera 117 can identify and transmit two-dimensional information about the environment, and the rangefinder 118 can add the third dimension.

The camera 117 and the rangefinder 118 can be carried by a tilt stage 114 and can be moved together as a unit to scan the environment around the scanner 110. The tilt stage 114 carries a tilt motor 115 that rotates the camera 117 and the rangefinder 118, as a unit, about a first axis (e.g., a horizontal axis H). A corresponding tilt encoder 116 tracks the motion of the camera 117 and the rangefinder 118 relative to the horizontal axis H. A pan motor 112 carried by the support 111 rotates the tilt stage 114 (including the camera 117 and the rangefinder 118) as a unit about a second axis (e.g., a vertical axis V). A pan encoder 113 tracks the rotational position of the camera 117 and the rangefinder 118 around the vertical axis V. Accordingly, the pan motor 112 and the tilt motor 115 can rotate to the camera 117 and the rangefinder 118 through arcs sufficient to cover a roughly hemispherical volume around the scanner 110.

In a particular embodiment, the rangefinder 118 can include a lidar detector, which emits and receives laser light (e.g., IR laser light). Suitable lidar detectors have range capabilities in the hundreds of meters, depending on factors that include the size of the emitter 119 and receiver or detector 120, and the ranging technology used. As discussed above the ranging technology can include a time of flight technique in one embodiment. In other embodiments, other techniques, such as SETS techniques, can produce suitable results without requiring direct time of flight calculations, at lower cost and lower (but still suitable) resolution. The scans can be conducted in a methodical sweep pattern, or a coarse scan followed by a detailed scan, or an adaptive scan (described further below with reference to FIGS. 9A-10), or via another suitable technique. In other embodiments, the rangefinder 118 can emit signals other than a laser signal, suitable for detecting the distance between the scanner 110 and the objects around it. For example, a radar signal can be used for tracking, though it is expected that a laser signal will out-perform a radar signal for scanning. In another embodiment, the laser scanner can be replaced by multiple high-resolution cameras or a structured light arrangement to perform the scanning process.

Figure 4:
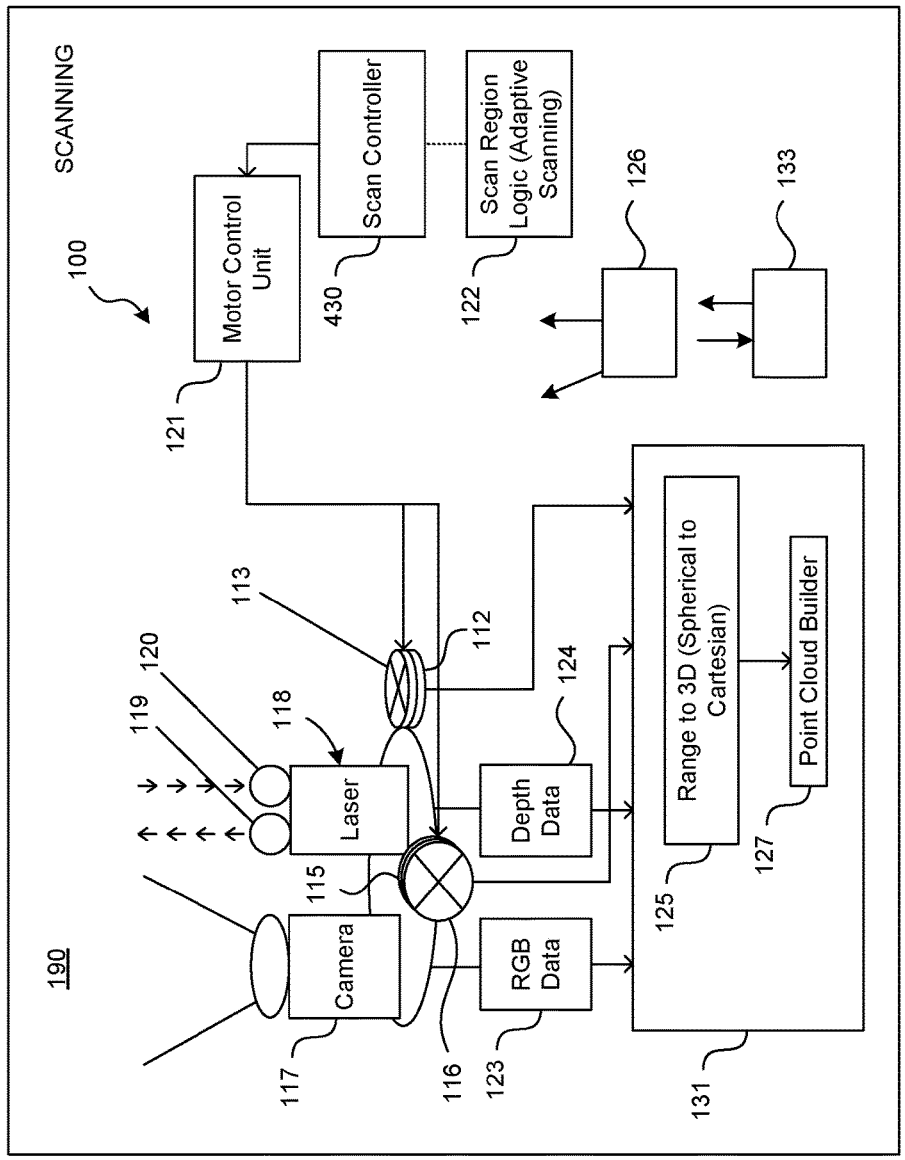
FIG. 4 is a block diagram illustrating components of a representative scanner operating in a scanning mode, in accordance with a representative embodiment of the present technology.

FIG. 4 is a schematic block diagram illustrating the system 100 operating in a scanning mode, in accordance with an embodiment of the present technology. As shown in FIG. 4, the camera 117 records images of the surrounding environment 190, while the rangefinder 118 records the distances to the objects within the environment 190. The camera 117 accordingly generates RGB data (or other optical data) 123 and the rangefinder 118 generates depth or distance data 124. The RGB data 123 is transmitted to the processor 131. The depth data 124 is converted from spherical coordinates to Cartesian coordinates at the processor using conventional converter logic 125 that operates on information from the tilt encoder 116 and the pan encoder 113. This transformed coordinate information is used to generate a point cloud from the data captured by the camera 117 and the rangefinder 118 using the point cloud builder logic 127.

The system 100 can also include a motor control unit that provides instructions to the tilt motor 115 and the pan motor 112, and is itself under the control of a scan controller 430. The scan controller 430 can include scan region logic 122, which is described in further detail below with reference to FIGS. 9A-10. The scan controller 430 can be a stand-alone controller, or it can be integrated with one or more other controllers, e.g., the controller 130 described above with reference to FIGS. 1A-1C.

A power supply 126 provides power to the various components of the system 100. The input/output device 133 receives information from an operator and provides output information to the operator. The result of the process performed during the scanning mode shown in FIG. 4 is a computer-based model (e.g., a point cloud) of the environment 190.

In particular embodiments, the data obtained during the scanning operation and used to build the three-dimensional model can be supplemented with additional data. For example, the model can be augmented or enhanced with photographs or other sensor readings taken by the scanner camera 117 or by a UAV that flies through the scanned environment. This operation can be conducted in real time in some embodiments, and offline in others. The enhancement can include adding the color information contained in the camera image to the points in the point cloud to produce a more realistic, colored model displaying the spectral representation at each point.

The data obtained from a particular scan can be stored and used later by the same scanner (e.g., in a track mode), or by a different scanner, also in the track mode, or by a UAV operating independently of an offboard tracking device. In a particular embodiment, when a tracker is positioned in a particular area, it can automatically access prior scans made of that environment, and those scans can be downloaded to the scanner as it operates in the track mode. Furthermore, a particular scan may be used at multiple locations, not necessarily the same as the location at which the initial scan was made. For example, a scan made of a particular wind turbine, power line tower, or other structure can be used to survey or inspect other structures that have an identical configuration, for example, wind turbines of the same make and model. In such cases, the scanned information can be calibrated to the particular location of an individual wind turbine, which may be different for each wind turbine.

Figure 5:
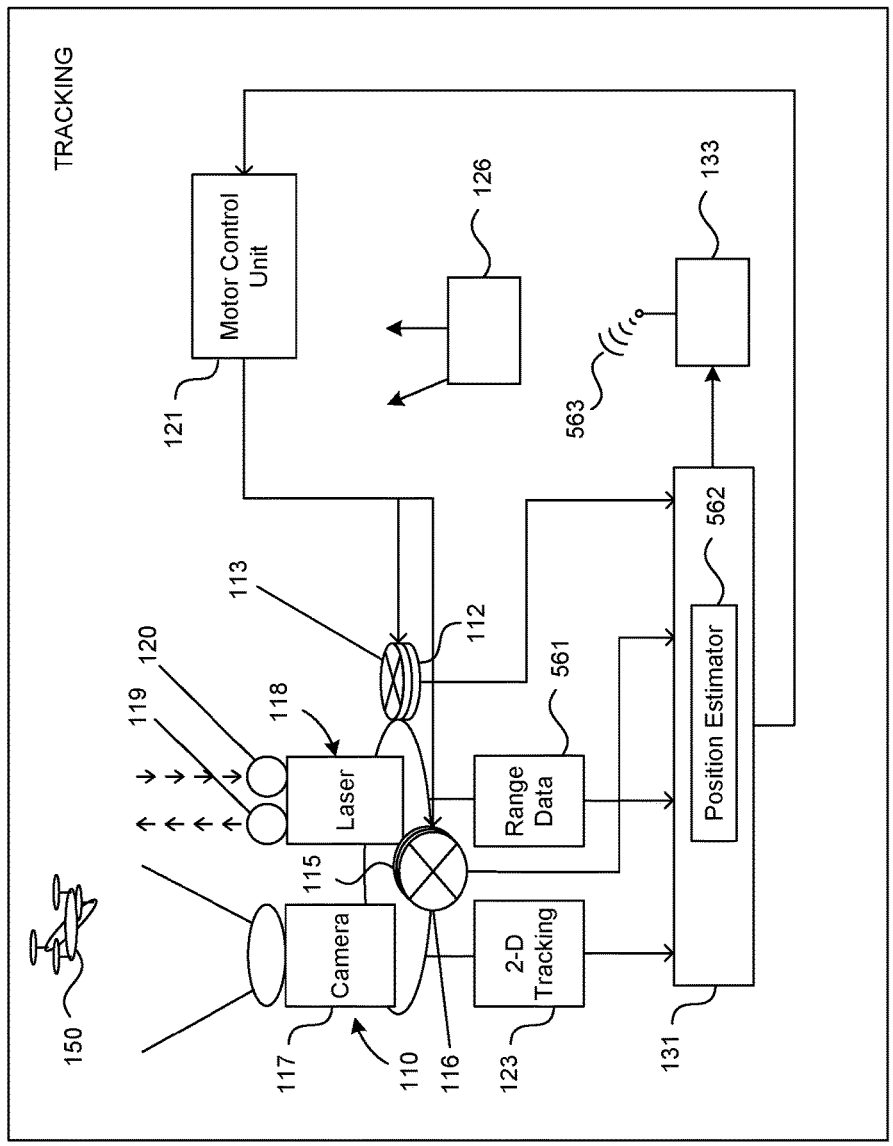
FIG. 5 is a block diagram illustrating components of a representative scanner operating in a tracking mode, in accordance with an embodiment of the present technology.

FIG. 5 illustrates the system 100 operating in a tracking mode. In this mode, the camera 117 identifies a UAV 150 (e.g. by tracking a fiducial such as an LED carried by the UAV, by matching airframe characteristics as trained by a machine learning algorithm, or by other means) and generates two-dimensional tracking data 123. Simultaneously, the rangefinder 118 generates range data 561 corresponding to the distance between the scanner 110 and the UAV 150, as the UAV flies. This information is provided to the processor 131 which generates an estimate of the position of the UAV 150 using position estimator logic 562. The position information can be transmitted to the I/O device 133, which can transmit the information via an information signal 563 to the UAV 150. With this information, the UAV 150 can modify, adjust, and/or compensate for variations in the flight path it executes. The position information is also transmitted to the Motor Control Unit 121 which actuates the pan motor 112 and tilt motor 115 to continuously keep the UAV 150 within the field of view of the camera 117 and in front of the rangefinder 118 as the UAV flies.

In another embodiment, the system can track the UAV 150 by combining corner cube interferometry with a laser-based position sensing device to generate the position estimate for the UAV 150. The position information can be transmitted to the I/O device 133 and UAV 150 so that it can modify, adjust, and/or compensate for variations in its flight path.

Figure 6A:
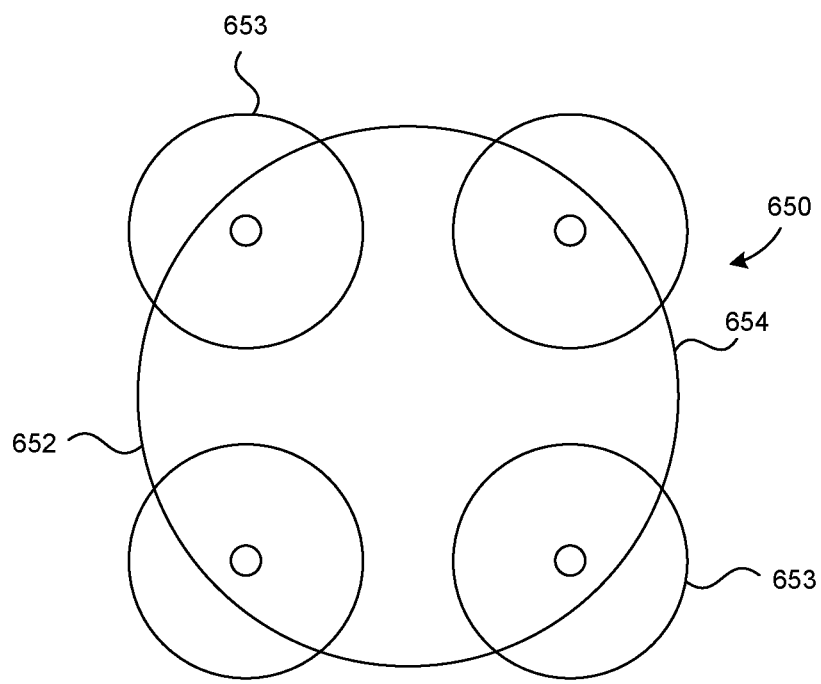
FIGS. 6A and 6B are schematic illustrations a UAV having a coding arrangement to facilitate identifying and/or tracking the UAV in accordance with an embodiment of the present technology.
Figure 6B:
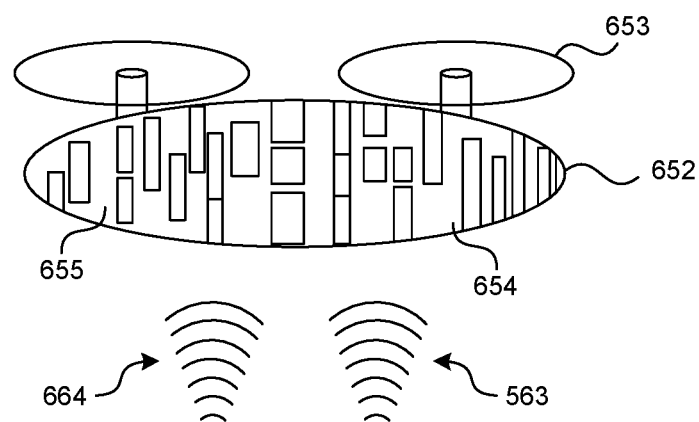

In particular embodiments, the system can, in addition to transmitting information to the UAV 150, receive information from the UAV 150. In a particular aspect of this embodiment, the information received from the UAV 150 can correspond to an identity of the UAV 150 and/or an orientation of the UAV 150. FIGS. 6A and 6B illustrate a representative UAV 650 having a body 652 and one or more rotors 653 (four are shown in FIGS. 6A and 6B) for propulsion. The UAV 650 can also include a physical encoding schema, for example a ring 654 or lighting system that in turn includes one or more coding patterns 655 (FIG. 6B). The coding patterns 655 can be used to identify the type of UAV detected by the scanner 110 (FIG. 5) during its tracking process, for example, to confirm that the proper UAV is being tracked. This procedure can also be used to identify new or additional UAVs that may enter the environment in which the tracking process is being conducted. Accordingly, the coding patterns 655 can perform the function of an identifying fiducial.

In addition, the coding patterns 655 can have different characteristics at different circumferential positions around the coding ring 654. Accordingly, when the system 100 detects the coding patterns 655, it can detect the orientation of the UAV 650. This information can in turn be used to help control, guide, and/or direct the UAV 650. To obtain this information, the camera 117 (or a separate, dedicated camera) can obtain an image of the coding patterns, which is then processed (e.g., in the manner of a bar coder). In another embodiment, the system 100 can issue an inquiry signal 664 (e.g., in addition to the information signal 563) that impinges on and is reflected by the coding pattern 655. The reflected signal is then processed to determine the orientation and/or identity of the UAV 650. In both of the foregoing embodiments, the coding pattern 655 is passive. In other embodiments, the coding pattern 655 can be actively transmitted by the UAV 650, e.g., via a radio emission, an LED pattern or flash sequence, and/or other suitable arrangements.

An advantage of the orientation function described above is that it may be more accurate than the orientation function provided by an on-board inertial navigation system. Another advantage is that on-board inertial navigation systems typically include a magnetometer, which can be affected by nearby structures, e.g., magnetic or metal structures. The off-board scanner can provide orientation information that is unaffected by such structures, allowing the UAV to operate in environments it might not otherwise be able to.

Figure 7:
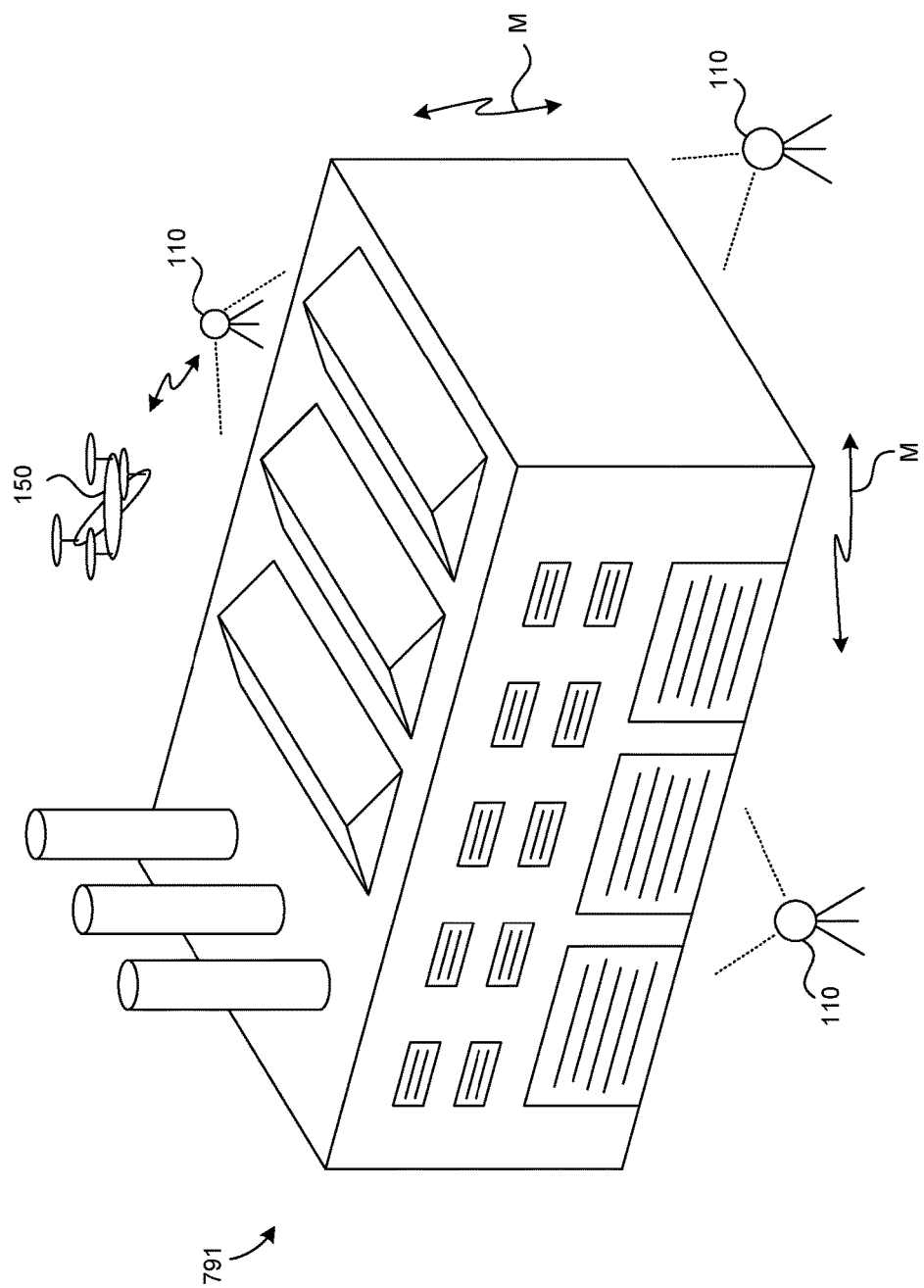
FIG. 7 illustrates an arrangement of multiple scanners positioned to scan an environment in accordance with an embodiment of the present technology.

In at least some instances, a single scanner may be insufficient to provide all the data required for the UAV to carry out its tasks. For example, as shown in FIG. 7, a target object 791 may include a building having target features that are not accessible to a single scanner at a single location. In one embodiment, the scanner 110 is moved among multiple locations to provide sufficient data for the desired point cloud. At each location, the scanner 110 obtains two-dimensional image data and depth data, as discussed above, and the multiple data sets can be "stitched" together to form a composite computer model. In other embodiments, multiple scanners 110 can be used to both scan the features of the building, and provide tracking for the UAV 150 as it flies its mission. The scanners 110 can communicate with each other, as indicated by arrows M so as to hand off tracking responsibility from one scanner to the other as the UAV 150 conducts its mission.

Figure 8:
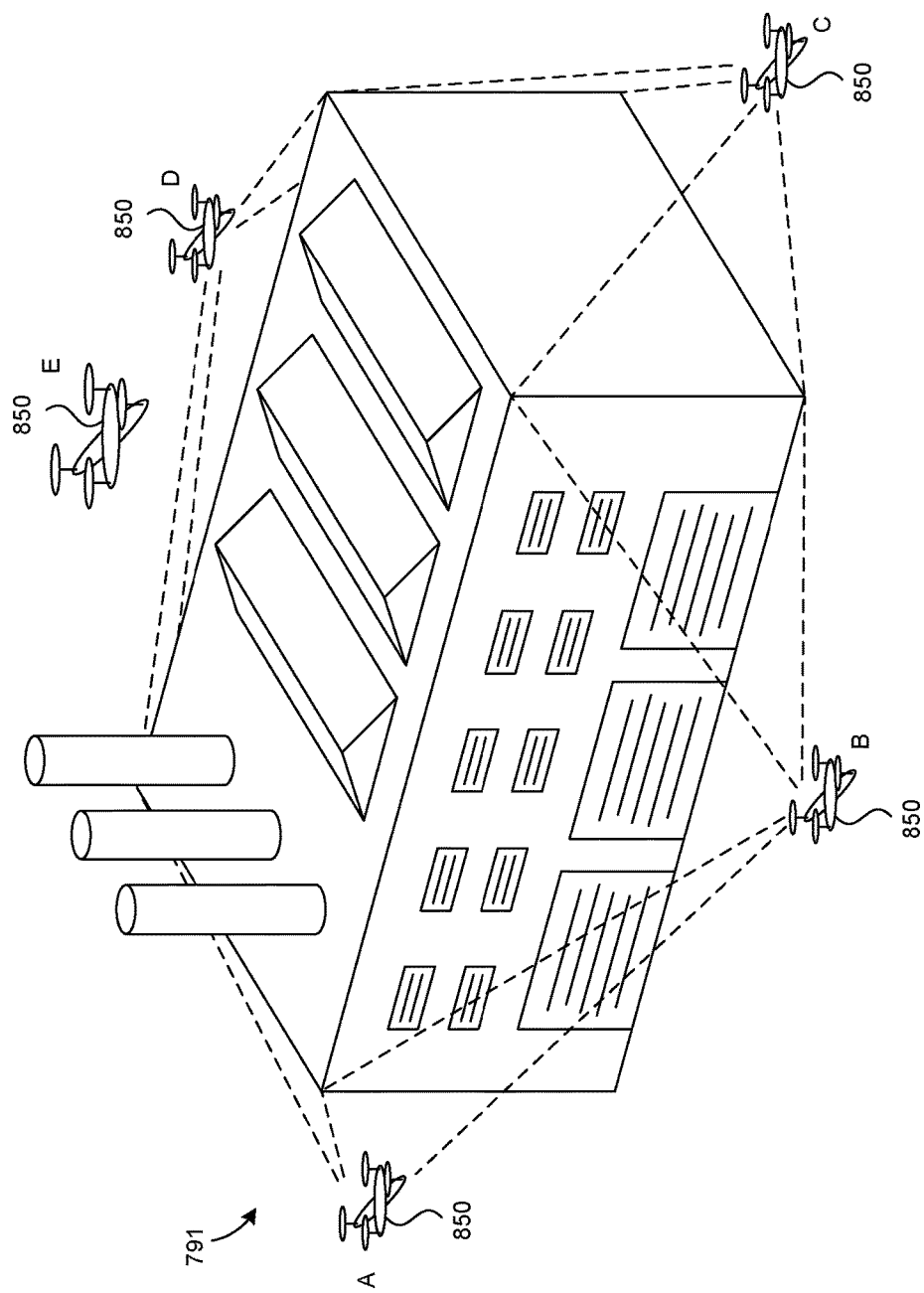
FIG. 8 illustrates an arrangement for carrying out a scanning operation via equipment carried by a UAV in accordance with an embodiment of the present technology.

In yet another embodiment, illustrated in FIG. 8, the scanning function can be performed by a UAV 850 itself. In such an embodiment, the scanning equipment is made compact and lightweight enough to be carried by the UAV 850. In some embodiments, the scanning equipment may be compromised in some manner to reduce its weight. For example, the scanning equipment may have a coarser resolution, reduced range, reduced field of view and/or other weight-saving features. However, with the system on board, the UAV 850 can assume the positions identified by letters A, B, C and D to map the features of the building 791. After mapping the features, the UAV 850 can carry out its mission, as indicated by letter E.

In the foregoing embodiment, the tracking function described above with reference to FIG. 5 may be performed by comparing images taken by the UAV 850 while it is in flight, with point cloud information produced by scans taken by the UAV while it is on the ground at positions A-D. In another embodiment, the tracking operation is carried out by two UAVs 850, each equipped with a scanner. Accordingly, one UAV 850 can fly a mission (e.g., an inspection mission) and the second UAV 850 can track the first UAV 850. The tracking function can be performed from any of the scanning positions A-D described above, or (with accommodations for an offset) from a different location.

The system can perform still further functions directed to tracking the UAVs. For example, in the track mode, the system can scan the environment to determine if a UAV is in the area. Upon detecting the UAV, the tracker can use any of the arrangements described above to identify the UAV and, optionally, its orientation. The tracker can also communicate with UAVs that are out of visual range or beyond line of sight (BLOS). Such UAVs can relay their position and trajectory to the tracker (for example, via GPS and radio communication) and the tracker can accordingly orient itself toward the position where the UAV is expected to come within range. Once the UAV comes within range, the tracker can carry out the tracking operations described above. In other embodiments, the UAV can be tracked using ADS-B in addition to, or in lieu of GPS. Still further, the system can scan a pre-scanned environment to check for new objects that may have entered the environment after the initial scan was completed. Such new objects can include a UAV, or other objects that may represent obstacles to a UAV. If such objects are detected, the three-dimensional model of the environment can be updated to reflect the existence of those objects.

As noted above with reference to FIG. 7, some arrangements can include multiple scanners for performing scanning and/or tracking functions. In such cases, these scanners can communicate with each other to provide continuity within the three-dimensional models that they create, and to transmit information related to UAVs in their individual environments. For example, the scanners can cooperate to give control priority to the scanner that is closest to the UAV, or that is projected to have the longest contact with the UAV before a handoff. In addition, whether an operation includes one scanner or more than one scanner the system can schedule on-board photo/recording/sensing functions. For example, it may be advantageous to direct the UAV to perform a sensing function from a precise location. When the scanner is performing in the tracking mode, it can alert the UAV when the UAV reaches the precise location, in real time, to ensure that the sensing function is performed at the proper location. This technique can also be used to capture an image of the UAV when it is in a particular location, using the ground-based camera portion of the scanner. In this manner, the UAV can capture an image at a particular location, and the scanner can capture an image of the UAV at that location. Both techniques can be used to improve the reproducibility of data, e.g., if the same image is to be obtained at different times. The UAV position information from the tracker can be used to reduce computation and improve the fit of photos to the cloud of points. For example, the downstream analysis of the data can be simpler and/or more accurate when the data are tagged with the precise location from which the data were taken.

3. Adaptive Scanning

Figure 9B:
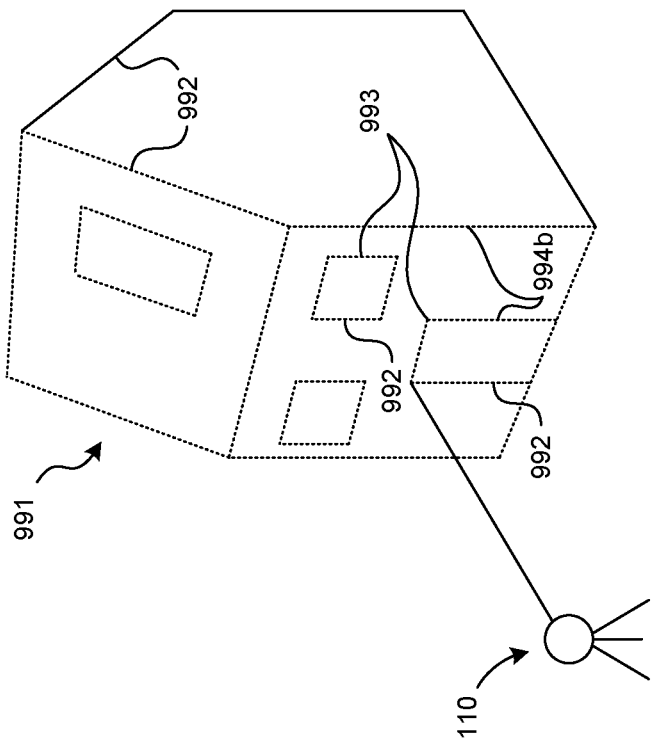
FIG. 9B schematically illustrates a technique for selectively scanning features of an object in accordance with an embodiment of the present technology.
Figure 9A:
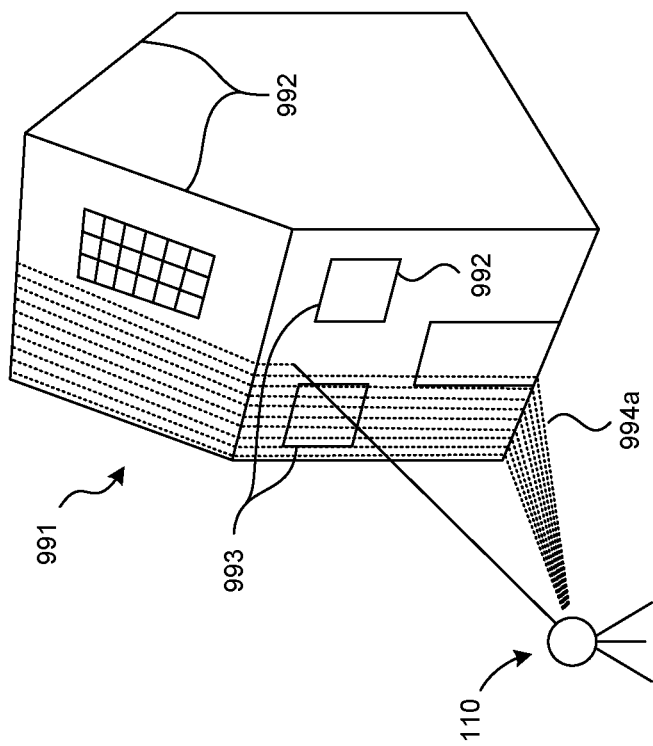
FIG. 9A schematically illustrates a conventional process for scanning an object.

FIG. 9A illustrates an object 991 being scanned by a scanner 110 in accordance with a conventional scanning technique. Using this technique, the scanner 110 methodically and sequentially pans and tilts to produce scan paths 994a (shown in dotted lines) that cover the object 991. This process can be time-consuming, particularly when only certain features of the object 991 may be of real interest to the end user. For example, the end user may be more interested in certain target features 992. The target features 992 can include straight lines that form target regions 993, for example, the roof and windows of the building.

FIG. 9B illustrates the scanner 110 carrying out an adaptive scan routine in accordance with an embodiment of the present technology. In this embodiment, the scan paths 994b executed by the scanner 110 are directed specifically to the target features 992 and therefore the target regions 993. As a result, the scanner 110 spends less time unnecessarily scanning features that are not of interest. Accordingly, the process of scanning the object 991 can take significantly less time than it does using conventional techniques, and can use significantly fewer resources.

Figure 10:
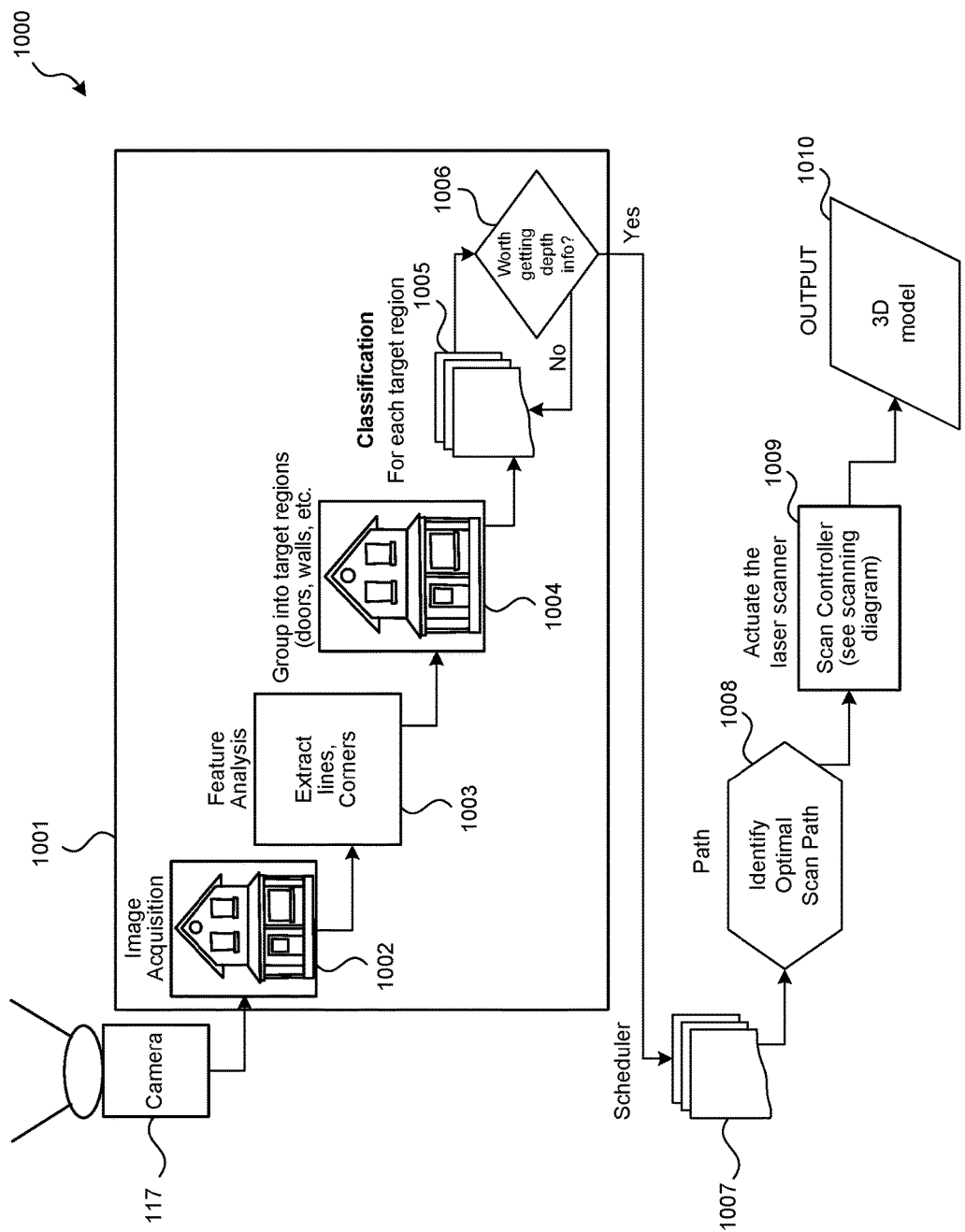
FIG. 10 is a schematic block diagram illustrating a process for identifying and scheduling features to be scanned in accordance with an embodiment of the present technology.
Figure 11:
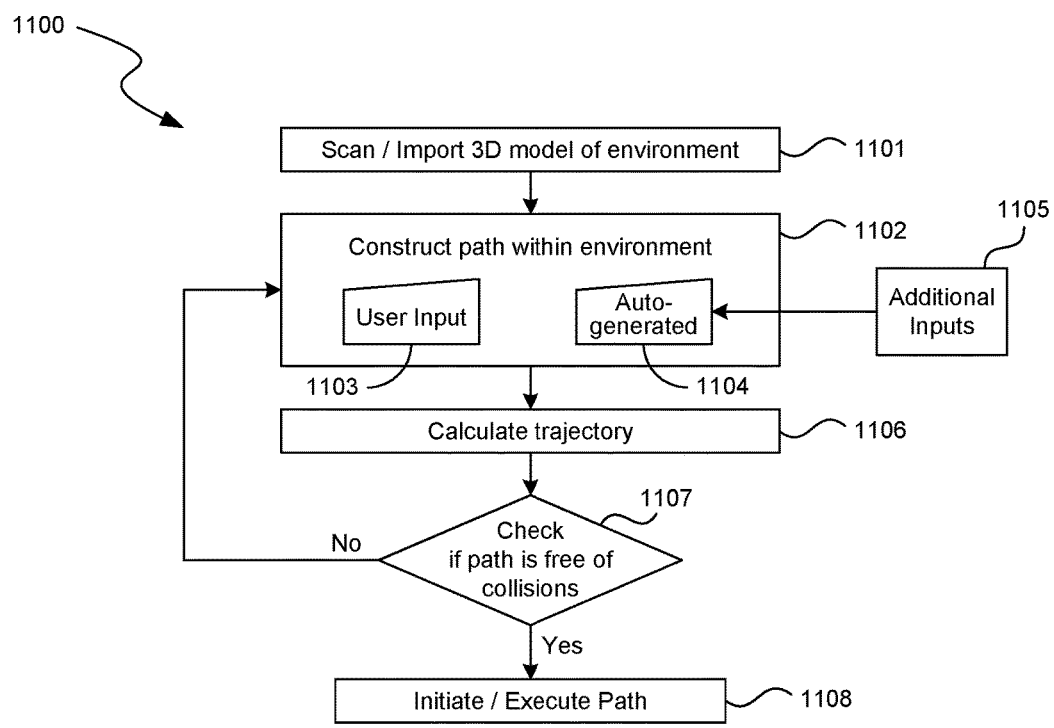
FIG. 11 is a flow diagram illustrating a process for planning and executing a flight path trajectory in accordance with an embodiment of the present technology.

FIG. 10 is a block diagram illustrating a process for carrying out the scanning operation shown in FIG. 9B. An overall process 1000 in accordance with an embodiment of the present disclosure includes an image processing block 1001 that in turn includes an image acquisition block 1002. At block 1002, the process includes acquiring image data, e.g., from the camera 117. At block 1003, the image data are analyzed, for example to identify particular features, and more particularly, features that are likely to be of interest, e.g., by an end user. Such features can include lines, corners, and/or other target shapes, or features that may be identified by a user.

At block 1004, the target shapes are grouped into regions, which may correspond to doors, windows, and/or other shapes or areas. Block 1005 and 1006 include classifying each of the target regions, for example, by selecting regions that are of interest for targeted scanning by the rangefinder 118 (block 1009). This process can be performed manually, automatically, or via a combination of manual and automated techniques. For example, the process can include using computer-based shape recognition routines to identify target features (or target regions) and a user can approve or reject the automatically generated selections. In other embodiments, the user can assume full control of the selection process (fully manual) or cede control (fully automated). In particular embodiments, algorithms such as Hough transforms are used to identify features and/or regions of interest. In other embodiments, machine learning and/or neural network techniques can be used to identify features and/or regions of interest, thus reducing the required user input. If the features and/or regions are of interest, a scheduler 1007 collects the information for each region and identifies an optimal (or at least expedient) scan path (block 1008). At block 1009, the scan controller 430 (FIG. 4) directs the camera 117 and the associated rangefinder 118 (FIG. 4) along the scan paths identified at block 1008. The output (block 1010) is a three-dimensional model, which the UAV uses to navigate and perform its mission.

4. Flight Path Planning

FIGS. 11-15C illustrate representative processes for forming or defining flight paths in accordance with which the UAV conducts its mission in the environment scanned by the scanner, as described above. A representative process 1100 shown in FIG. 11 includes scanning the environment or importing a three-dimensional model of the environment (block 1101). At block 1102, the process includes constructing a flight path within the environment. In a particular embodiment, the flight path is constructed using user input 1103. For example, the user can view the three-dimensional model on a computer screen and, via a mouse, keys, a joystick, and/or other input devices, construct the flight path. Because the flight path is three-dimensional, the system can allow the user to rotate the image in any manner (e.g., tumble the image) so as to view the environment from multiple perspectives and provide a suitable three-dimensional flight path.

In another embodiment, the flight path can be automatically generated, as indicated by block 1104. In this case, the process may require additional inputs 1105. Such inputs can include a general characterization of the desired flight path, for example, an identification of the regions of interest and the distance away from the regions of interest that the UAV is to fly. It may be of particular importance to maintain a set distance from an object, (a) to prevent collisions with the object, and/or (b) to keep the object within the target range of a sensor aboard the UAV. Additionally, the information can include the speed of the UAV, the flight dynamics and capabilities of the UAV, and any restrictions or limitations associated with the ability of the UAV to point its camera or other sensor toward the target region. Based on this information, and an input from the user (e.g., the user can click on a feature or object, and select an offset distance), the system can automatically generate a flight path. The flight path can be a single-pass path or a multi-pass path (e.g., a "lawnmower" pattern) depending on factors including the field of view of the UAV-based sensor, and the desired resolution of the object it senses.

Block 1106 includes calculating a predicted trajectory based on the UAV path determined at block 1102, taking into account the speed of the UAV, the flight dynamics and capabilities of the UAV, and other restrictions as described above. Block 1107 includes checking to determine if the path is free of collisions, for example, collisions with the objects represented in the model imported at block 1101. If the path does include collisions (or greater than a threshold likelihood of collisions), the process returns to block 1102 for adjustments to the flight path. As an example, the process can prevent areas of the path that are causing the collisions from being included in a subsequent construction of a suitable path. If not, then the flight path can be initiated and executed, as indicated at block 1108.

Figure 12:
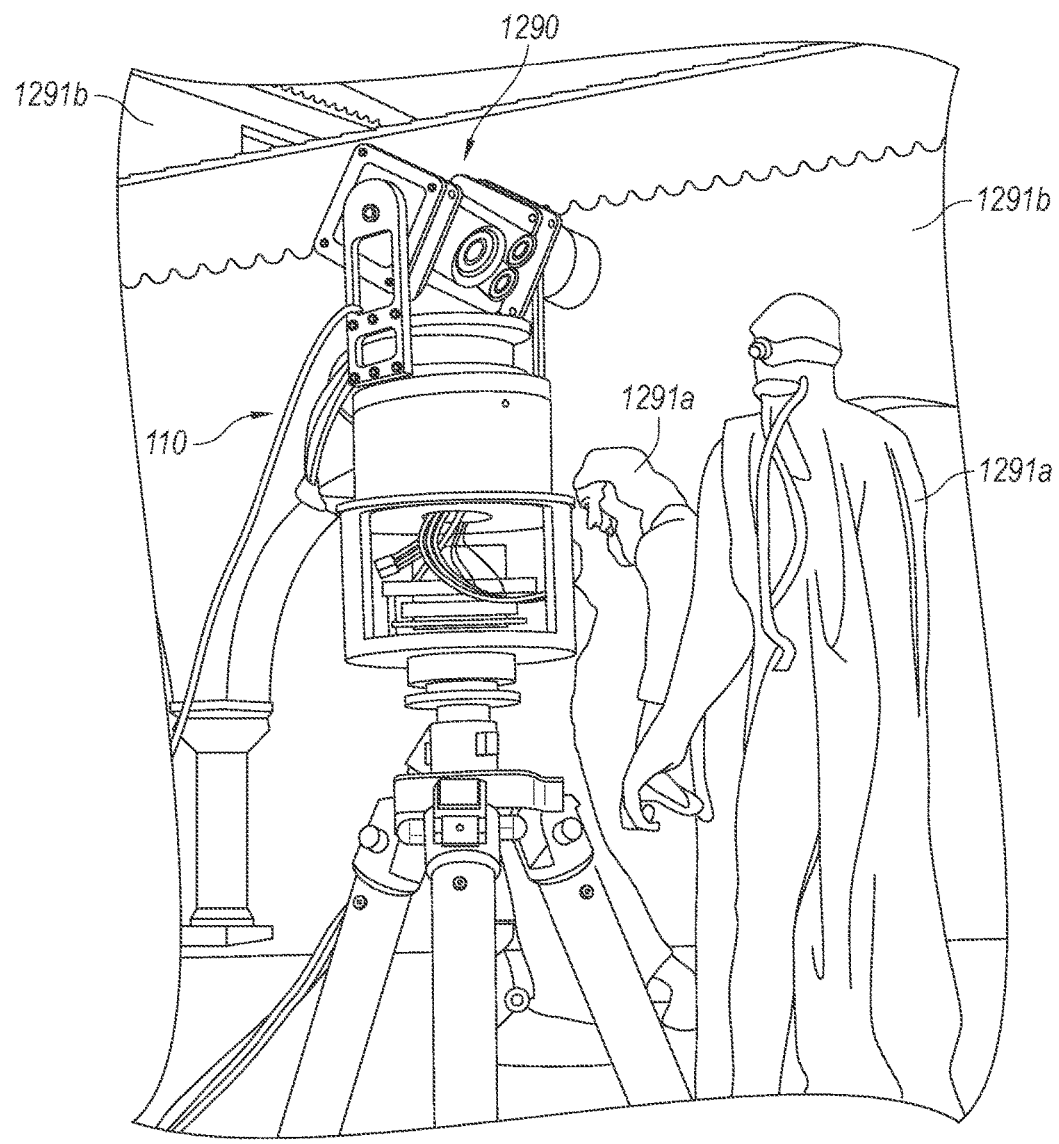
FIG. 12 illustrates a scanner positioned in an environment in accordance with an embodiment of the present technology.
Figure 13A:
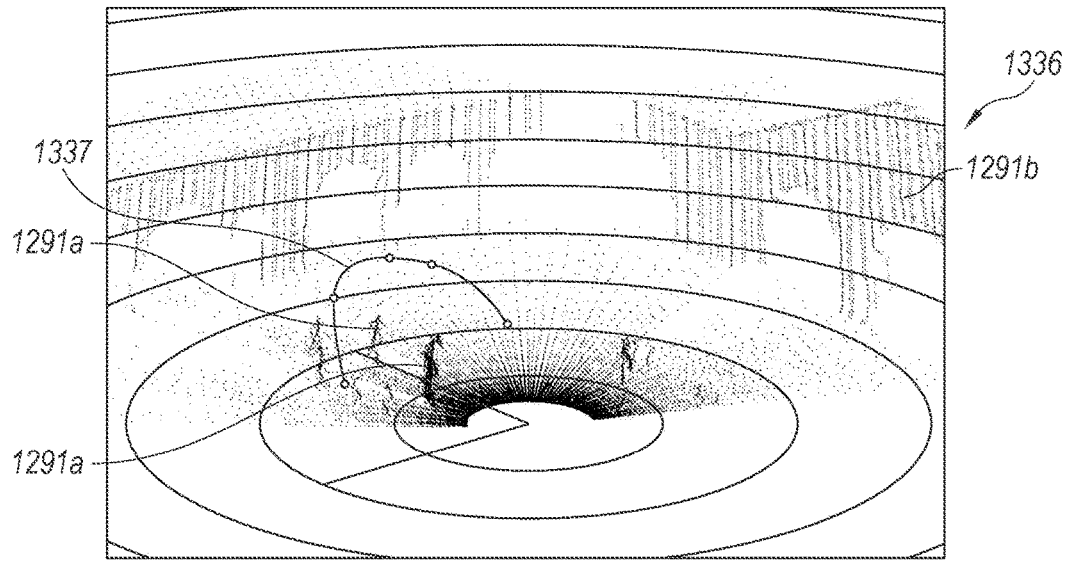
FIGS. 13A-13B illustrate isometric and plan views, respectively, of an image of the environment shown in FIG. 12.
Figure 13B:
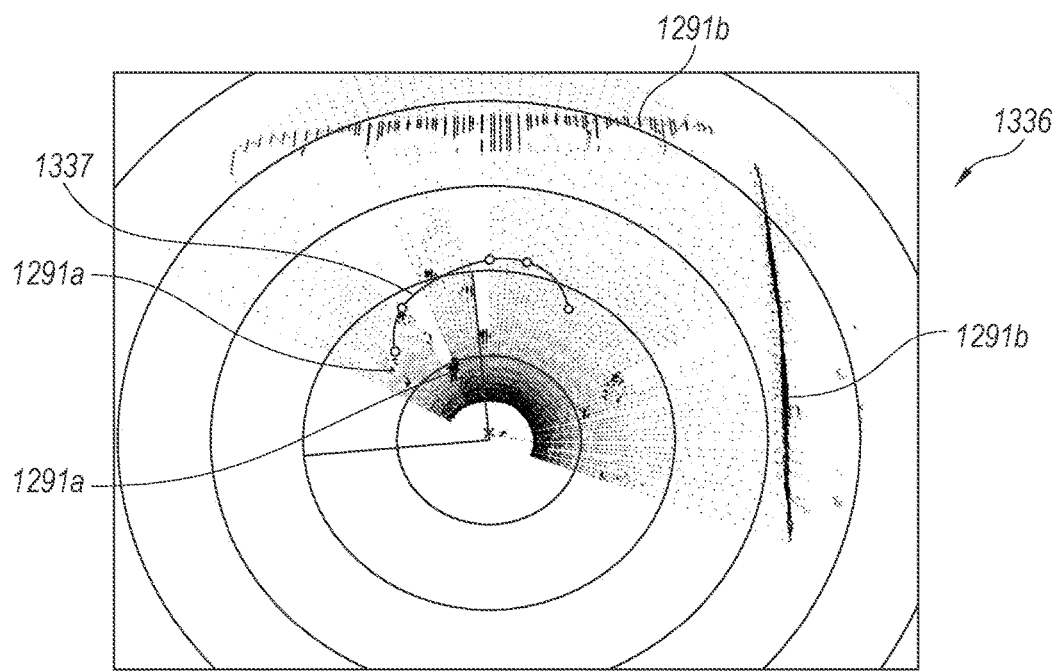

FIG. 12 illustrates the scanner 110 in a representative environment 1290 that includes first objects (e.g., statues 1291a) and second objects (e.g., buildings 1291b). FIG. 13A illustrates the computer-based model of the environment, including the statues 1291a and the buildings 1291b, based on data obtained from the scanner 110. FIG. 13A also illustrates a proposed flight path 1337 that may be constructed by a user viewing the pointcloud of the environment 1336. FIG. 13B is a plan view (top-down) of the pointcloud environment 1336 shown in FIG. 13A. The user can toggle between preset views (e.g., plan view, side view, front view, etc.), or can move gradually and incrementally at any pace from one view to another by tumbling around the pointcloud environment 1336.

Figure 14:
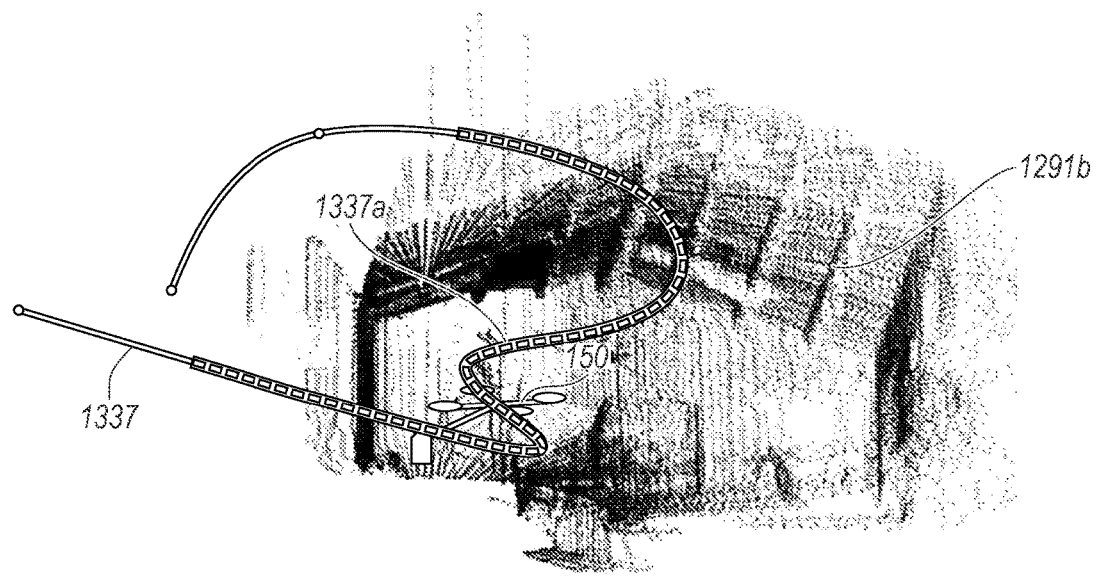
FIG. 14 illustrates an image of another portion of the environment shown in FIG. 12.

FIG. 14 illustrates one of the buildings 1291b shown in FIGS. 13A and 13B along with the proposed flight path 1337. The proposed flight path 1337 includes an interfering portion 1337a where the UAV would collide with, or come too close to, the building 1291b. Accordingly, the user is alerted to the interference, for example, by displaying the interfering portion 1337a of the flight path in a different color than the non-interfering portion. In other embodiments, the system can use other alerting techniques (e.g., flashing lights, and/or an audible signal). Additionally, the system can prevent the user from flying the mission until the interfering portion is removed, e.g. by modifying the flight path.

Figure 15C:
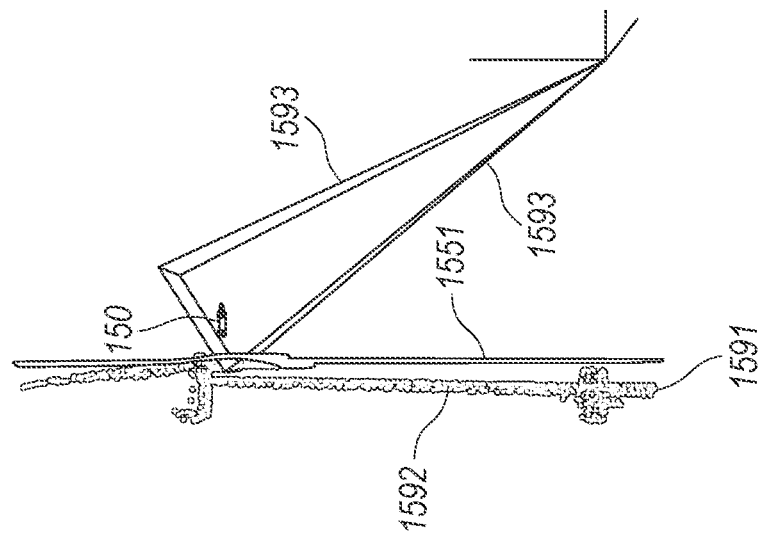
FIGS. 15A-15C illustrate front, top, and side views of an environment that includes wind turbine, and an associated UAV flight path, in accordance with an embodiment of the present technology.
Figure 15B:
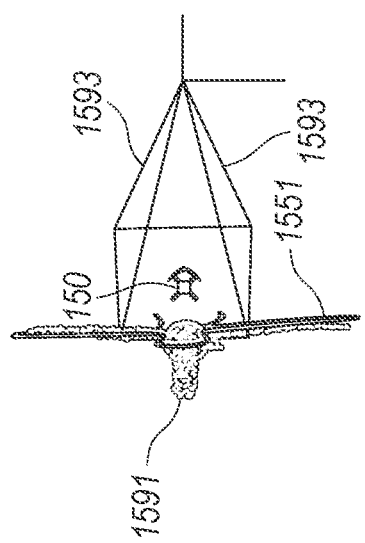
Figure 15A:
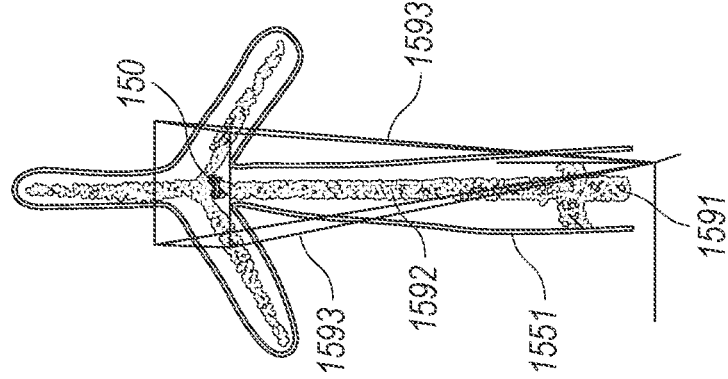

FIGS. 15A, 15B, and 15C are front, top, and side views of an object 1591 that includes a wind turbine 1591. FIGS. 15A-C also illustrate a flight path 1551 along which a UAV 150 flies to examine the wind turbine 1591, and a (schematic) field of view 1593 for the ground-based scanner. The three-view illustration is suitable for indicating to the user that no collisions or likely collisions exist for the UAV 150. As discussed above, the image may also be tumbled or otherwise rotated to provide this information to the user. In any of the foregoing embodiments, the data collected by the scanner can be used to aid the UAV in performing at least two functions. First, the data can be used to aid the UAV in carrying out the substance of its mission. For example, as shown in FIGS. 15A-C, the mission may include inspecting the blades of a wind turbine. Accordingly, the image data can provide an accurate indication of the location of the blades and/or other areas of interest that the UAV may focus on as part of its mission. Second, the data can aid the UAV in avoiding obstacles as it carries out its mission. For example, the image data can allow the UAV to avoid striking the pylon 1592 that carries the wind turbine blades.

In the embodiment shown in FIGS. 15A-15C, the wind turbine 1591 is stopped while the UAV 150 performs its inspection. In another embodiment, the UAV 150 can perform the inspection while the turbine blades are spinning, as illustrated in a representative embodiment shown in FIGS. 16A-16D.

Figure 16A:
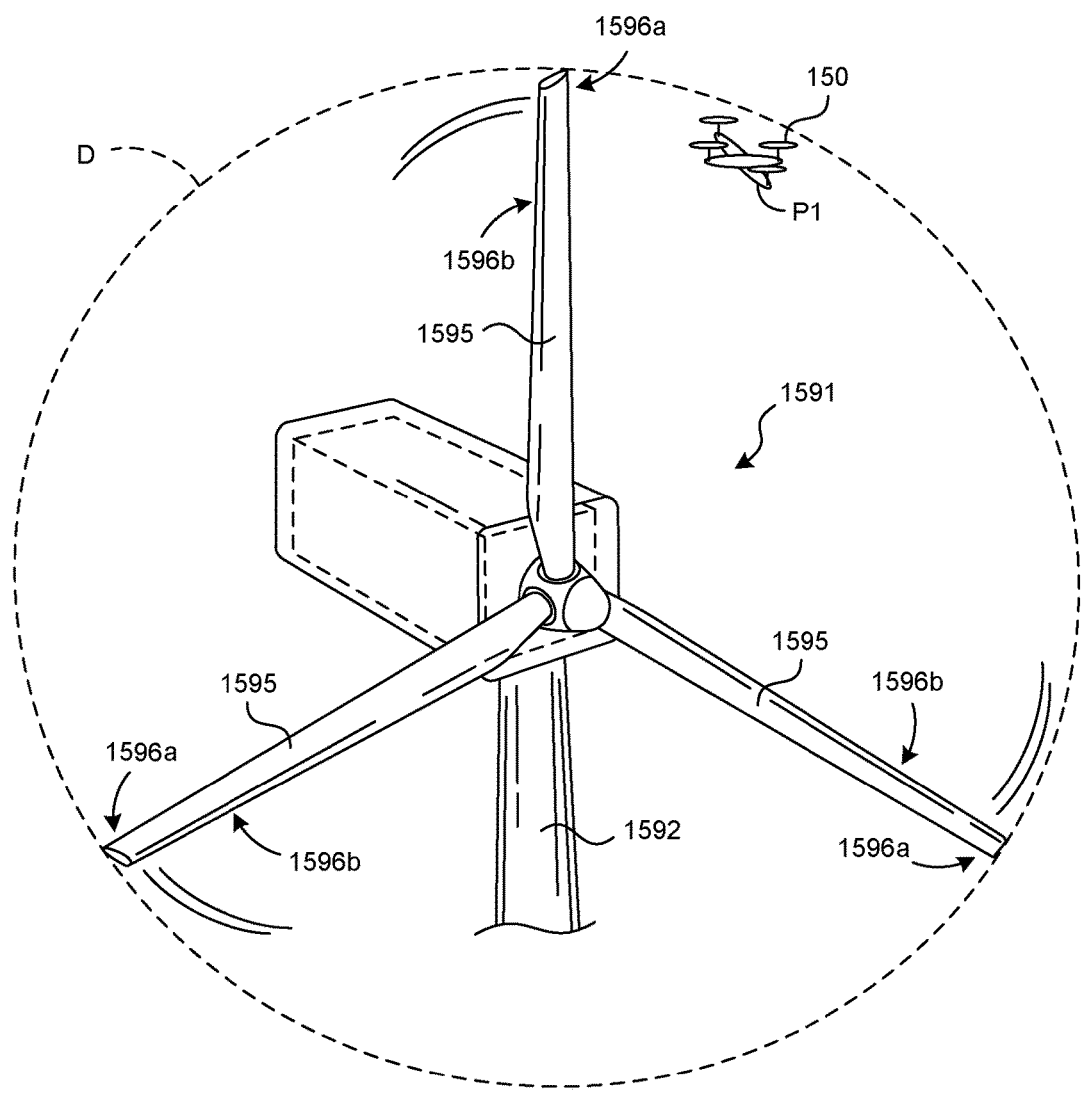
FIGS. 16A-16D illustrate a process for obtaining data from wind turbine blades while the blades are in motion, in accordance an embodiment of the present technology.

Beginning with FIG. 16A, the wind turbine 1591 includes the pylon 1592 described above, which carries three blades 1595. When the blades 1595 are in motion, they sweep out a disk D. Each blade 1595 can include multiple regions extending inwardly from the blade tips. Two representative regions are illustrated in FIGS. 16A-16D as a first region 1596a and a second region 1596b. In the embodiment shown in FIG. 16A, the UAV 150 moves to a first position P1 located toward the outer periphery of the disk D, so as to be aligned with the first regions 1596a of each blade 1595 as the blades pass by.

Figure 16B:
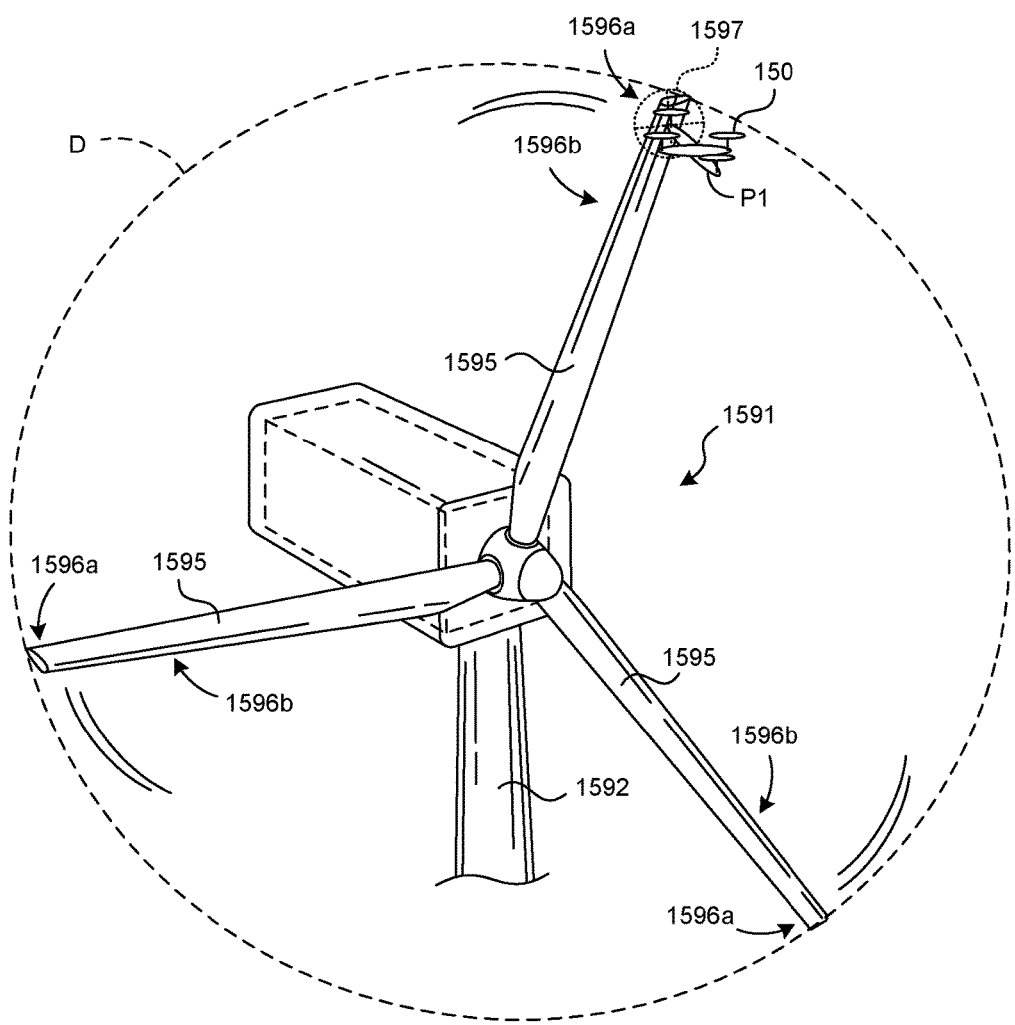
Figure 16C:
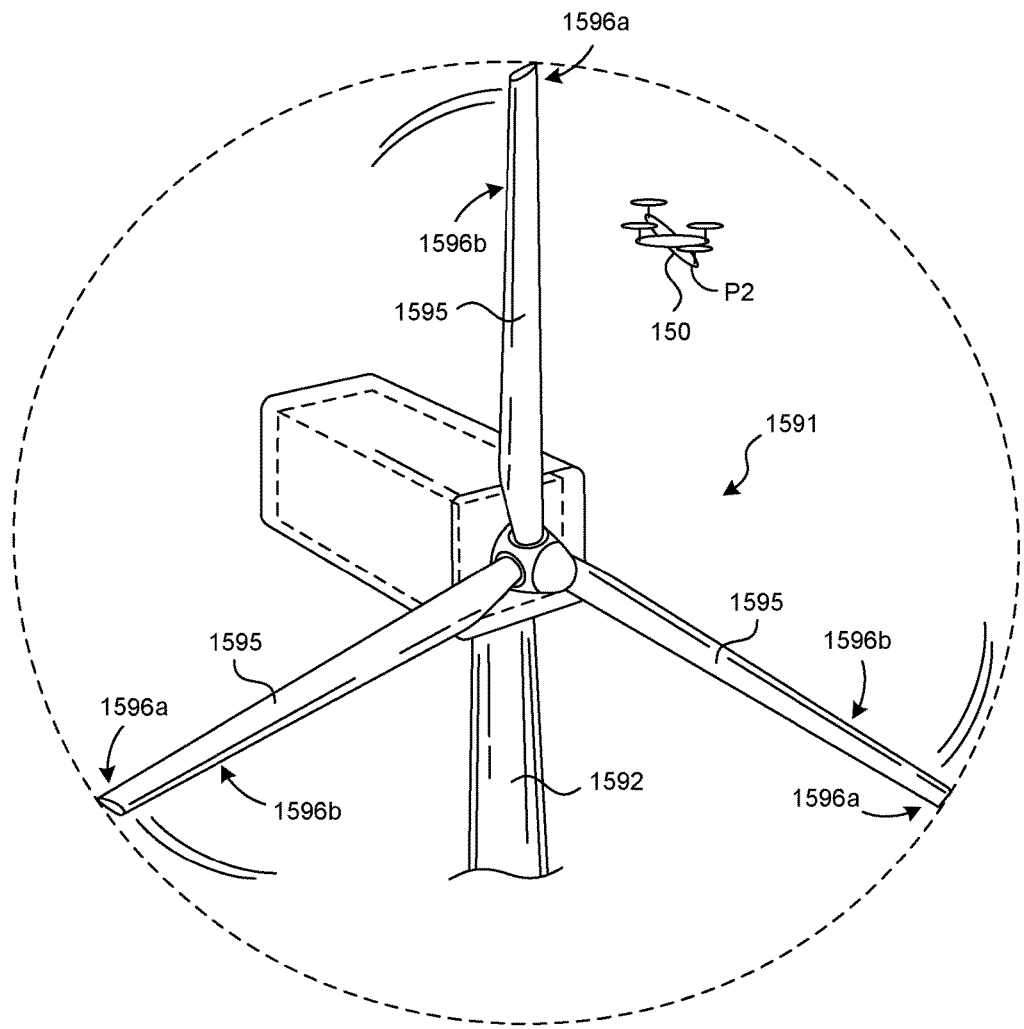
Figure 16D:
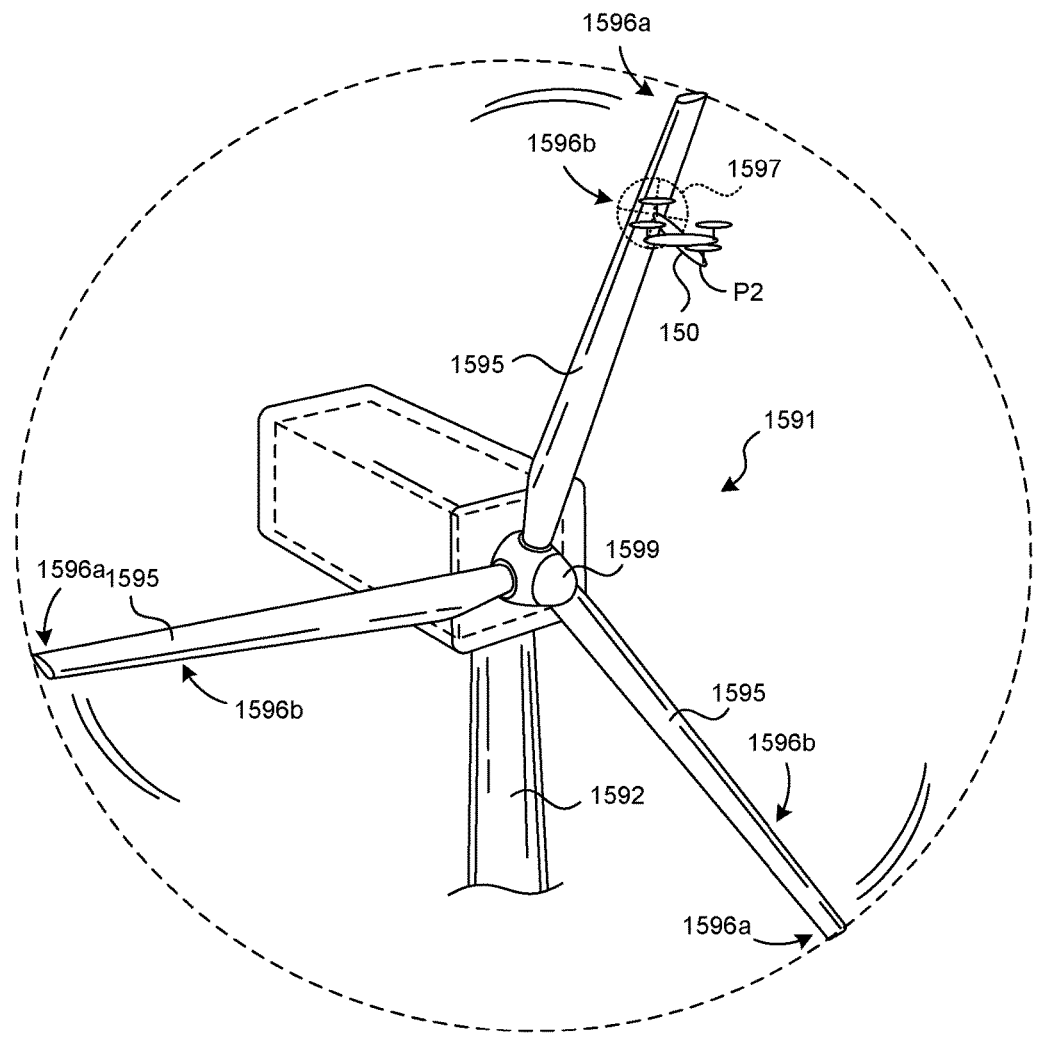

Referring now to FIG. 16B, the first region 1596a of one of the blades 1595 has rotated into the field of view 1597 of a sensor carried by the UAV 150. With the first region 1596a in the field of view 1597, as determined by the UAV and/or the ground-based scanner/tracker, the sensor is activated. For example, when the sensor includes a camera, the camera is activated to take an image of the first region 1596a. The UAV 150 can remain in the first position P1 and, as the first region 1596a of each successive blade 1595 passes into the field of view 1597, the UAV 150 can activate the sensor to take an image or collect other data. When the first regions 1596a of each blade 1595 have been imaged or otherwise sensed, the UAV 150 can move to a second position P2, as shown in FIG. 16C. From the second position P2, the UAV 150 can image or otherwise sense the second regions 1596b of each blade 1595, as shown in FIG. 16D. The foregoing process can be repeated for additional regions of interest, e.g., regions located inwardly from the second region 1596b toward the hub 1599 from which the blades 1595 extend. An advantage of the foregoing approach is that the wind turbine 1591 need not be halted while the UAV 150 obtains diagnostic information, including but not limited to image data of the blades 1595. This in turn can increase the run time of the wind turbine 1591 without compromising on the need for obtaining periodic diagnostic data.

One feature of at least some of the foregoing embodiments is that the system can include a combination of a camera (or other two-dimensional imaging device) and a laser scanner (or other rangefinder) to map out an environment in which a UAV is expected to fly. One advantage of this arrangement is that it is relatively inexpensive when compared to traditional surveying laser scanners, or spinning lidar devices. Another advantage of the foregoing arrangement is that it provides capabilities different than those of existing systems. For example, existing surveying rangefinders operate at about 0.5-1 Hz and provide resolution at a millimeter or sub-millimeter level. Embodiments of the present system operate at rates of 50 Hz-100 Hz, which (unlike a 1 Hz rate) are sufficient to keep pace with the flight speeds and offset distances of typical UAVs. The resolution of embodiments of the present system can be reduced to the centimeter level, which is sufficient for typical UAV tasks, and reduces the cost of the system.

Yet another expected advantage of embodiments of the disclosed systems is that they can be located off-board the UAV and therefore do not require the UAV to provide payload capacity and processing power for the scanning and mapping equipment. Instead, the payload capacity can be reserved for mission-performance equipment, and the power can be conserved for conducting the UAV's mission. This feature can be particularly important for UAVs that have limited battery capacity. Still another advantage is that the combined scanner and rangefinder arrangement is compact and is therefore more portable than other mapping equipment, for example, equipment that includes an array of infrared cameras.

Another feature of at least some of the foregoing embodiments is that the scanner can perform a tracking function, in addition to a scanning function. An advantage of this feature is that the UAV can be told what its position is from an off-board source on roughly the same time scale at which it is flying. In particular, the UAV can receive updates multiple times per second, and at a rate that allows it to change course if necessary, for example, to avoid obstacles. Another advantage of this feature is that the UAV's position can be continually compared to a pre-defined flight path that has been defined using an accurate, three-dimensional model of the local environment. Accordingly, the likelihood for the UAV to get off track is reduced, and if the UAV does get off track, the system can redirect the UAV with a high degree of accuracy.

Yet another feature of at least some of the foregoing embodiments is that the process for planning a flight can be automated, semi-automated, and/or more visually interactive than conventional waypoint planning arrangements. An advantage of this arrangement is that it can speed up the process for flightpath planning, particularly, in cluttered local environments. Another advantage is that the flight path can be more accurate, which again has particular utility in GPS-denied or crowded areas where GPS is either unavailable or insufficient to provide the level of detail required to navigate through such areas. Yet another advantage is that the interface can be intuitive. This is so for at least the reason that the objects presented at the interface are visually representative of the objects as they actually appear. A building looks like a building, a tree looks like a tree, etc. Still another advantage is that the interface can better simulate (via rotation or tumbling) the actual three-dimensional environment, and the user can appreciate the three-dimensional nature of the flight environment by rotating the image so as to see obstacles and targets of interest from multiple angles. This is unlike typical flight planning arrangements in which the user has to imagine the height of obstacles. Still another advantage is that at least some aspects of the flight planning process can be automated. For example, the user can input a representative flight path, which can be automatically evaluated for collision problems. The flight path can also automatically be adjusted to provide a constant offset from a particular object, for example, a wind turbine blade that is being inspected by the UAV flying along the flight path.

Still another feature of at least some of the foregoing embodiments is that the process for obtaining the data used to build the three-dimensional model can be adapted to account for the environment that is scanned. In particular, the scanning process can be focused on areas of interest, rather than the environment as a whole. An advantage of this approach is that the process for scanning the environment can be faster because areas that are similar (e.g., large flat surfaces) and areas that are physically unscannable (e.g., the sky) may be avoided and therefore do not take time to map. Another advantage is that the limited number of data points available for a particular model can be focused on the areas of interest so that those areas are modeled with greater resolution than areas that are of less importance. In addition, the overall number of points required to define a particular model can be reduced. Still further, the demands on (and therefore the cost of) the scanning motors are reduced when fewer data points are taken. This approach can reduce the cost/complexity of the overall system.

5. Further Embodiments

In particular embodiments, the scanner 110 remains in the same position for both the scanning operation and the tracking operation. In other embodiments, the scanner may be moved between these two operations. In such cases, the process for tracking the UAV can include accounting for an offset between the position at which the scanner conducted the scan, and the position from which the scanner tracks the UAV. The offset can be determined using GPS and/or other suitable techniques. A particular scan may be tagged with its GPS coordinates so that it can be used for multiple missions, each of which may have the tracker at a different location. The GPS coordinates from which the initial scan is made can provide a constant reference point suitable for multiple uses. Alternatively, a local coordinate system can be used in lieu of GPS.

In particular embodiments, the fiducial carried by the UAV can take the form of a coding pattern, as described above. In other embodiments, the fiducial can include other arrangements, for example, an LED or LED pattern. In still further embodiments, when in the track mode, the scanner can identify the UAV by matching certain characteristics of the UAV (e.g., its silhouette) with a library of pre-identified silhouettes as trained by machine learning algorithms, e.g. a deep neural network.

From the foregoing, it will be appreciated that specific embodiments of the present technology have been described herein for purposes of illustration, but that various modifications may be made without deviating from the technology. For example, while certain embodiments have been described in the context of UAVs, in other embodiments, similar techniques may be used for other types of robots, e.g., water-based robots and in particular, submersible robots, which can confront issues associated with three-dimensional environments similar to those confronted by air vehicles. In particular embodiments described above, the tracking mode includes tracking coordinates. In other embodiments, the tracking mode can include tracking the direction of travel, the UAV speed, and/or other variables, in addition to or in lieu of tracking the vehicle coordinates. The tracking process and the associated scanning process can be performed outdoors, as shown in several of the Figures above, and can also be performed indoors. The system can cycle or oscillate between the scanning mode and the tracking mode, even when used in the same environment, for example, to detect changes in the environment. Such changes can then be imported into the point cloud or other computer-based image file so as to update the associated three-dimensional model. Particular embodiments of the system were described above in the context of a quad-rotor UAV, and in other embodiments, the UAV can have other quad-rotor or non-quad-rotor configurations.

The scanner can have different arrangements in different embodiments. For example, in a representative embodiment described above, the camera and rangefinder each have independent optical paths to the environment and the UAV. In another embodiment, a prism or other beam splitter provides identical optical information to both the camera and the rangefinder. This approach can improve the correspondence between information provided by the camera and information provided by the rangefinder. In other embodiments, the scanner can include devices other than a single camera and a single rangefinder, e.g., multiple cameras (having different fields of view, wavelength sensitivities, and/or other functional parameters) and/or multiple rangefinders (having different sensitivities over different distances, and/or other functional parameters).

Certain aspects of the technology described in the context of a particular embodiment may be combined or eliminated in other embodiments. For example, in particular embodiments, the flight path planning algorithm described above can be used independently of the scanning and tracking processes described above. In another embodiment, the adaptive scanning techniques described above can be used independently of the tracking and/or flight planning processes described above. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

The present application is related to the following co-pending, concurrently-filed applications, each of which is herein incorporated by reference in its entirety: U.S. patent application Ser. No. 15/059,030, filed Mar. 2, 2016, titled SCANNING ENVIRONMENTS AND TRACKING UNMANNED AERIAL VEHICLES, U.S. patent application Ser. No. 15/059,069, filed Mar. 2, 2016, titled SCANNING ENVIRONMENTS AND TRACKING UNMANNED AERIAL VEHICLES, and PCT Application No. PCT/US16/20509, filed Mar. 2, 2016, titled SCANNING ENVIRONMENTS AND TRACKING UNMANNED AERIAL VEHICLES. To the extent any materials incorporated herein by reference conflict with the present disclosure, the present disclosure controls.

The invention claimed is:

1. A method, performed by a computing system having a memory and a processor, for tracking a flight of an unmanned aerial vehicle in an environment using a three-dimensional model of the environment, the method comprising:
    with a scanner system, comprising at least one camera that is remote from the unmanned aerial vehicle,
        tracking the flight of the unmanned aerial vehicle in the environment based at least in part on:
            identifying the unmanned aerial vehicle within at least one image captured by the at least one camera,
            determining a position and/or orientation of the unmanned aerial vehicle based at least in part on at least one physical coding pattern associated with the unmanned aerial vehicle,
            confirming an identity of the unmanned aerial vehicle based at least in part on the at least one physical coding pattern associated with the unmanned aerial vehicle, and
            causing at least a rotation of the at least one camera so that the unmanned aerial vehicle remains within a field of view of the at least one camera, and
        comparing the flight of the unmanned aerial vehicle in the environment to a flight path constructed in the three-dimensional model;
        determining that the flight of the unmanned aerial vehicle has deviated from the flight path constructed in the three-dimensional model; and
        in response to determining that the flight of the unmanned aerial vehicle has deviated from the flight path constructed in the three-dimensional model,
            redirecting the flight of the unmanned aerial vehicle in accordance with the flight path constructed in the three-dimensional model at least in part by transmitting guidance information to the unmanned aerial vehicle.

2. The method of claim 1, wherein tracking the flight of the unmanned aerial vehicle in the environment comprises:
    repeatedly capturing an image with at least one camera; and
    analyzing the captured images to estimate the position and orientation of the unmanned aerial vehicle.

3. The method of claim 1, wherein tracking the flight of the unmanned aerial vehicle in the environment comprises:
    repeatedly capturing an image with at least one camera;
    analyzing the captured images to locate the unmanned aerial vehicle; and
    determining or estimating a distance to the unmanned aerial vehicle with at least one rangefinder wherein the at least one rangefinder comprises at least one of:
        a light ranging rangefinder, or
        a radio frequency ranging rangefinder.

4. The method of claim 1, wherein tracking the flight of the unmanned aerial vehicle in the environment comprises:
    receiving Automatic Dependent Surveillance—Broadcast information from the unmanned aerial vehicle.

5. The method of claim 1, further comprising:
    while tracking the unmanned aerial vehicle,
        updating the three-dimensional model of the environment.

6. The method of claim 5, wherein updating the three-dimensional model of the environment comprises:
    capturing, with the at least one camera, images of the environment;
    identifying features within one or more of the captured images of the environment;
    generating, with a rangefinder, depth data at least in part by determining the distance from the rangefinder to each of a plurality of the identified features;
    transforming the generated depth data from spherical coordinates to Cartesian coordinates based at least in part on information collected from a tilt encoder and a pan encoder; and
    generating, with the processor, an updated three-dimensional model of the environment based at least in part on the transformed depth data.

7. The method of claim 6, further comprising:
    comparing the updated three-dimensional model of the environment to the three-dimensional model of the environment to identify new objects within the environment.

8. The method of claim 1, further comprising:
    providing, for presentation to a user, information characterizing a visual representation of the three-dimensional model of the environment.

9. The method of claim 1, wherein comparing the actual flight of the unmanned aerial vehicle in the environment to the flight path constructed in the three-dimensional model comprises:
    receiving speed and location information from the unmanned aerial vehicle; and comparing the received speed and location information from the unmanned aerial vehicle to the flight path constructed in the three-dimensional model.

10. The method of claim 1, further comprising:
receiving, from a user, input related to a proposed flight path for the unmanned aerial vehicle through the environment; and
constructing the flight path in the three-dimensional model based at least in part on the received input and flight dynamics and capabilities of the unmanned aerial vehicle.

11. The method of claim 1, further comprising:
retrieving the three-dimensional model from a library of previously-generated three-dimensional models.

12. The method of claim 11, wherein at least one of the three-dimensional models of the library of previously-generated three-dimensional models is used to track the path of an unmanned vehicle through multiple environments.

13. The method of claim 1, wherein the at least one captured image of the unmanned aerial vehicle is captured by a camera attached to another unmanned aerial vehicle.

14. The method of claim 1, wherein the three-dimensional model of the environment is generated at least in part by:
capturing, with each of a plurality of scanners located at different locations, images of the environment and depth information associated with each of a plurality of features identified in the images, wherein each scanner comprises at least one camera and at least one rangefinder; and
based on the depth information, stitching together at least two of the images of the environment to form a composite three-dimensional model of the environment.

15. The method of claim 1, wherein tracking the flight of the unmanned aerial vehicle in the environment comprises:
comparing images taken by a camera attached to the unmanned aerial vehicle to the three-dimensional model of the environment.

16. The method of claim 1, further comprising:
receiving information corresponding to restrictions on a flight path for the unmanned aerial vehicle; and
providing feedback if the flight path constructed in the three-dimensional model violates the restrictions.

17. The method of claim 1, wherein the physical coding pattern includes at least one of an LED pattern or flash sequence.

18. The method of claim 1, wherein the physical coding pattern is passive.

19. The method of claim 1, wherein the physical coding pattern is actively transmitted.

20. A non-transitory computer-readable storage medium storing instructions that, if executed by a computing system having a processor, cause the computing system to perform a method for tracking a flight of an unmanned aerial vehicle in an environment using a three-dimensional model of the environment, the method comprising:
tracking the flight of the unmanned aerial vehicle in the environment based at least in part on:
identifying the unmanned aerial vehicle within at least one image captured by at least one camera remote from the unmanned aerial vehicle,
determining a position and/or orientation of the unmanned aerial vehicle based at least in part on at least one physical coding pattern associated with the unmanned aerial vehicle,
confirming an identity of the unmanned aerial vehicle based at least in part on the at least one physical coding pattern associated with the unmanned aerial vehicle, and
causing at least a rotation of the at least one camera so that the unmanned aerial vehicle remains within a field of view of the at least one camera, and
comparing the actual flight of the unmanned aerial vehicle in the environment to a flight path constructed in a three-dimensional model;
determining that the actual flight of the unmanned aerial vehicle has deviated from the flight path constructed in the three-dimensional model; and
in response to determining that the actual flight of the unmanned aerial vehicle has deviated from the flight path constructed in the three-dimensional model constructed in the three-dimensional model,
transmitting guidance information to the unmanned aerial vehicle.

21. The computer-readable storage medium of claim 20, wherein the tracking of the flight of the unmanned aerial vehicle in the environment is further based at least in part on position information received from the unmanned aerial vehicle.

22. A system comprising:
a scanner comprising:
a camera,
a rangefinder,
a tilt encoder, and
a pan encoder; and
one or more processors that, when executing instructions stored on at least a memory, are configured to:
generate a three-dimensional model of an environment based at least in part on:
information collected from the camera,
information collected from the rangefinder,
information collected from the tilt encoder, and
information collected from the pan encoder;
calculate a projected flight path for an unmanned aerial vehicle through three-dimensional model of the environment, wherein the scanner is remote from the unmanned aerial vehicle;
cause the unmanned aerial vehicle to begin a flight through the environment in accordance with the projected flight path;
track the flight of the unmanned aerial vehicle through the environment based at least in part on:
information collected from the camera,
information collected from the tilt encoder,
information collected from the pan encoder,
identifying the unmanned aerial vehicle within at least one image captured by the camera,
determining a position and/or orientation of the unmanned aerial vehicle based at least in part on at least one physical coding pattern associated with the unmanned aerial vehicle,
confirming an identity of the unmanned aerial vehicle based at least in part on the at least one physical coding pattern associated with the unmanned aerial vehicle, and
causing at least a rotation of the camera so that the unmanned aerial vehicle remains within a field of view of the camera, and
compare the tracked flight of the unmanned aerial vehicle through environment to the projected flight path of the unmanned aerial vehicle through the three-dimensional model of the environment.

23. The system of claim 22, wherein the one or more processors are further configured to:
   receive an indication of a plurality of target features of the environment, wherein the camera captures only images of the environment that include one or more of the target features of the environment.

\* \* \* \* \*